United States Patent
Dawkins et al.

(10) Patent No.: US 11,106,543 B2
(45) Date of Patent: Aug. 31, 2021

(54) APPLICATION IMAGE CLONING SYSTEM

(71) Applicant: Dell Products L.P., Round Rock, TX (US)

(72) Inventors: William Price Dawkins, Lakeway, TX (US); Shyamkumar T. Iyer, Austin, TX (US); Kurtis John Bowman, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 357 days.

(21) Appl. No.: 16/402,813

(22) Filed: May 3, 2019

(65) Prior Publication Data

US 2020/0349019 A1   Nov. 5, 2020

(51) Int. Cl.
  *G06F 16/172*   (2019.01)
  *G06F 11/14*    (2006.01)

(52) U.S. Cl.
  CPC ........ *G06F 11/1458* (2013.01); *G06F 16/172* (2019.01)

(58) Field of Classification Search
  None
  See application file for complete search history.

(56) References Cited

U.S. PATENT DOCUMENTS

| | | | |
|---|---|---|---|
| 8,676,809 B1 | 3/2014 | Naftel | |
| 8,706,947 B1* | 4/2014 | Vincent | G06F 16/16 |
| 9,588,976 B1* | 3/2017 | Riel | G06F 16/13 |
| 10,558,705 B2* | 2/2020 | Sengupta | G06F 16/901 |
| 2007/0057958 A1* | 3/2007 | Bucher | G06F 16/27 |
| 2010/0153617 A1 | 6/2010 | Miroshnichenko et al. | |
| 2012/0005672 A1* | 1/2012 | Cervantes | G06F 16/30 |
| 2015/0378766 A1* | 12/2015 | Beveridge | G06F 16/273 |

\* cited by examiner

*Primary Examiner* — Son T Hoang

(74) *Attorney, Agent, or Firm* — Haynes and Boone, LLP

(57) ABSTRACT

An application image cloning system includes a processing system that is coupled to a memory fabric memory system and a local memory system. The processing system provides a first application and a second application using an application image stored in the memory fabric memory system and provides a mapping engine. The mapping engine receives, from the first application, a store request to store a modified memory page that is a modified version of a memory page included in the application image, such that the memory page is stored in a memory fabric memory location in the memory fabric memory system. The mapping engine stores the modified memory page in a local memory location in the local memory system, disassociates the first application from the memory fabric memory location that stores the memory page, and associate the first application with the local memory location that stores the modified memory page.

20 Claims, 21 Drawing Sheets

APPLICATION IMAGE CLONING SYSTEM

BACKGROUND

The present disclosure relates generally to information handling systems, and more particularly to cloning application images in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, may utilize an application image (e.g., an operating system image, a virtual machine image, etc.) to provide multiple instances of an application and/or to provide application data to the applications when those applications are operating. As such, an application image may be cloned for each application that is provided using (and/or accessing) the application image. As would be understood by one of skill in the art in possession of the present disclosure, conventional application image cloning involves making a full copy of an existing application image (called a parent or "golden" application image) to provide a "cloned" application image that is an exact copy of the parent application image. In situations where the server device utilizes a memory fabric, the application image(s) may be stored in persistent storage devices such as, for example, storage class memory (SCM) devices and, as such, any changes to made to the parent application image (e.g., new configuration package installs) may be persistent. As will be appreciated by one of skill in the art in possession of the present disclosure, the cloning operations discussed above include copy intensive operations that utilize valuable processing cycles from the processing system in the server device, particularly when only minor changes have been made to the parent application image.

Accordingly, it would be desirable to provide an improved application image cloning system.

SUMMARY

According to one embodiment, an Information Handling System (IHS) includes a processing system; and a local memory system that is coupled to the processing system and that includes instructions that, when executed by the processing system, cause the processing system to provide a mapping engine that is configured to: receive, from a first application, a first store request to store a modified first memory page that is a modified version of a first memory page included in a plurality of memory pages included in an application image stored in a memory fabric memory system, wherein the first memory page is stored in a first memory fabric memory location that is included in the memory fabric memory system and that is associated with the first application and a second application in a memory fabric management database; store the modified first memory page in a first local memory location in the local memory system; modify, in the memory fabric management database, notational reference information in order to disassociate the first application from the first memory fabric memory location that stores the first memory page; and associate the first application with the first local memory location that stores the modified first memory page, wherein the second application remains associated with the first memory fabric memory location that stores the first memory page.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
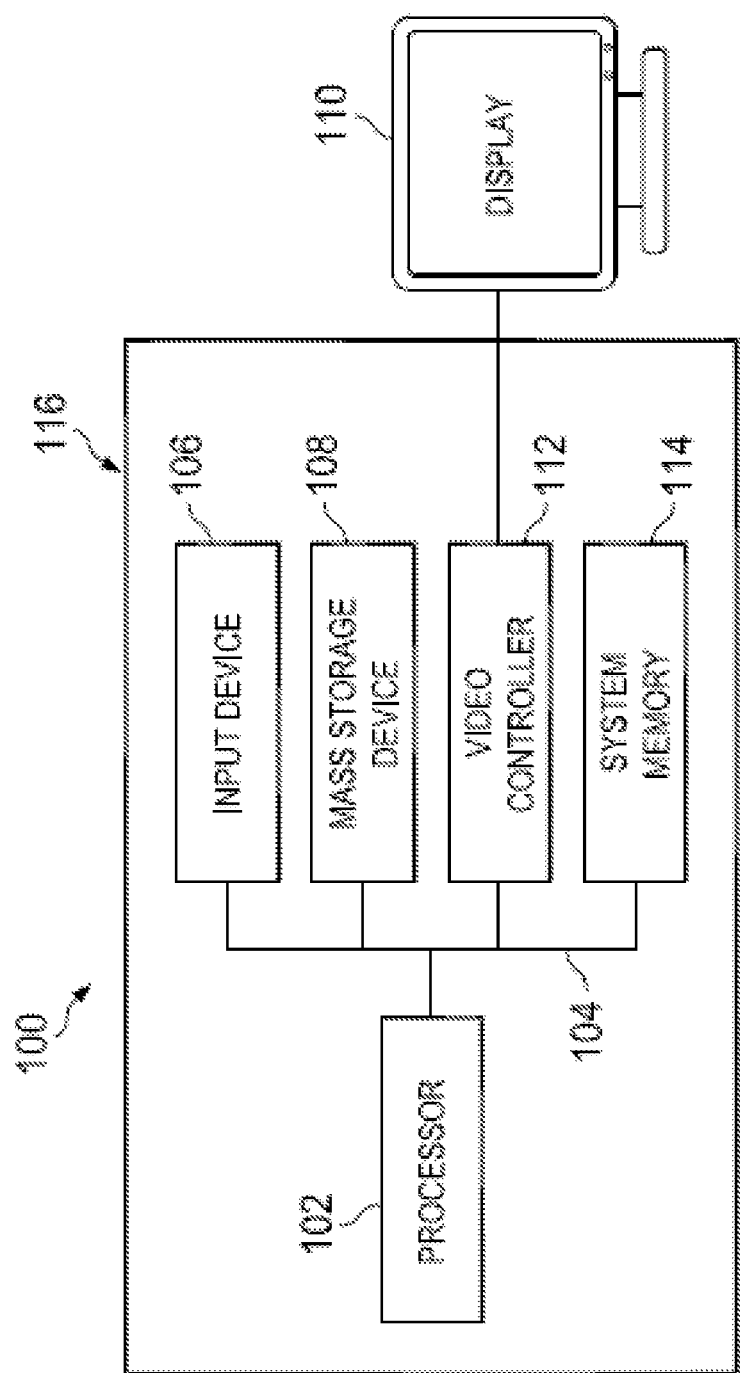
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
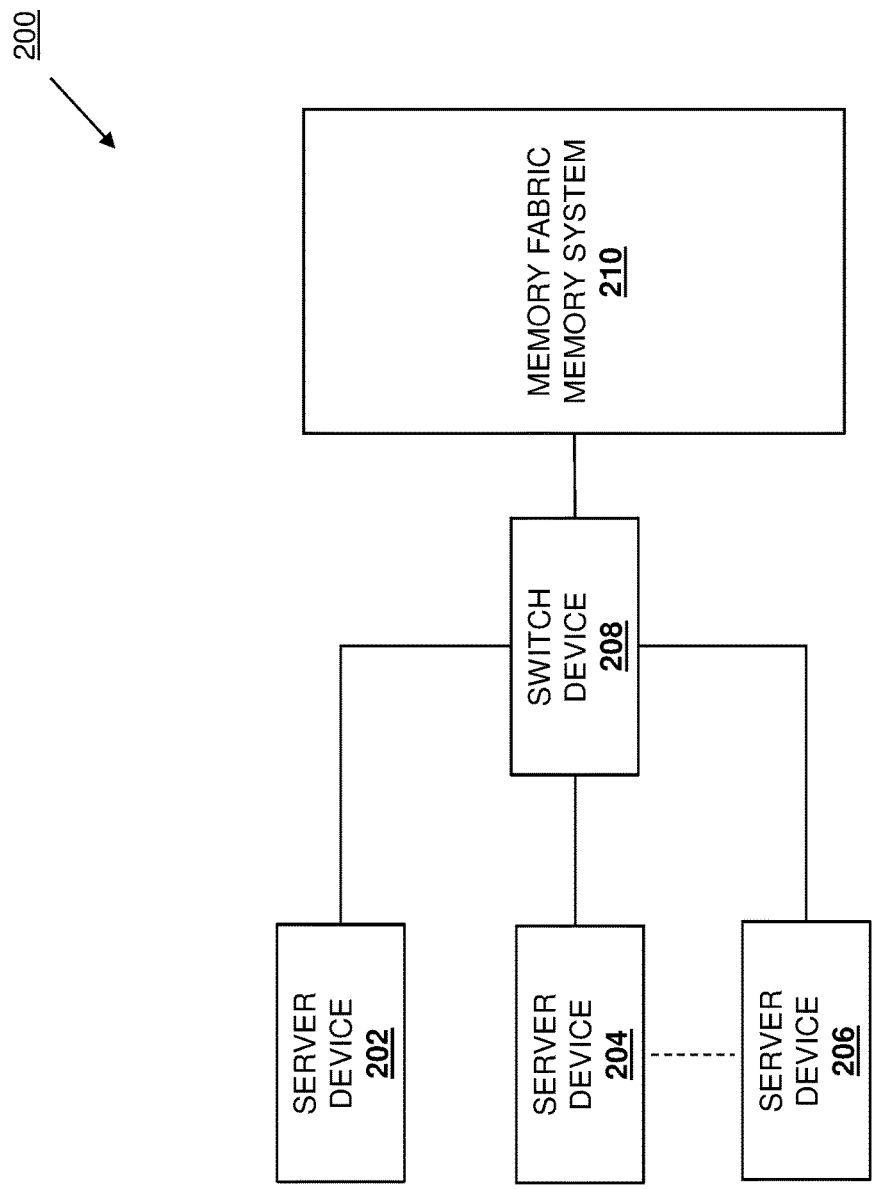
FIG. 2 is a schematic view illustrating an embodiment of a networked system.

Referring now to FIG. 2, an embodiment of a networked system 200 is illustrated. In the illustrated embodiment, the networked system 200 includes a plurality of server devices 202, 204, and 206. In an embodiment, any or all of the server devices 202, 204, and 206 may be provided by the IHS 100 discussed above with reference to FIG. 1, and/or may include some or all of the components of the IHS 100. However, while illustrated and discussed as server devices, one of skill in the art in possession of the present disclosure will recognize that the server devices 202, 204, and 206 provided in the networked system 200 may include any devices that may be configured to operate similarly to the server devices 202-206 discussed below. While only three server devices 202, 204, and 206 are illustrated and discussed below, one of skill in the art in possession of the present disclosure will recognize that many more server devices may (and typically will) be provided in the networked system 200 (e.g., a datacenter) while remaining within the scope of the present disclosure.

In the Illustrated embodiment, the server devices 202, 204, and 206 are each coupled to a switch device 208 (e.g., via a network that may be provided in the networked system 200 by, for example, a Local Area Network (LAN), the Internet, and/or any other network (or combination of networks) that would be apparent to one of skill in the art in possession of the present disclosure.) In an embodiment, the switch device 208 may be provided by the IHS 100 discussed above with reference to FIG. 1, and/or may include some or all of the components of the IHS 100. In a specific example, the switch device 208 may be provided by a Gen-Z switch device that has been configured to provide the application image cloning functionality discussed below. However, while discussed herein as being provided by a switch device, one of skill in the art in possession of the present disclosure will recognize that the switch device 208 may be replaced with a bridge device and/or other devices with similar functionality while remaining within the scope of the present disclosure as well.

Furthermore, the illustrated embodiment of the networked system 200 includes a memory fabric memory system 210 that is coupled to the server devices 202, 204, and 206 via the switch device 208. In an embodiment, the memory fabric memory system 210 may be provided by the IHS 100 discussed above with reference to FIG. 1, and/or may include some or all of the components of the IHS 100. In specific examples, the memory fabric memory system 210 may be provided by one or more separate server devices, as a logical portion of one or more of the server devices 202, 204, and 206, and/or in a variety of other manners that would be apparent to one of skill in the art in possession of the present disclosure. In the embodiments discussed below, the memory fabric memory system 210 provides a network-connected memory fabric that may be utilized by any of the server devices 202, 204, and 206 via the switch device 208.

For example, the network-connected memory fabric may be a Gen-Z memory fabric developed and commercialized by the Gen-Z consortium, and which one of skill in the art in possession of the present disclosure will recognize extends the processing system/memory system byte-addressable load/store model to the entire networked system 200 by decoupling the processing system/compute functionality in the server devices 202, 204, and 206 from the memory system/media functionality in the memory fabric memory system 210, allowing processing systems and memory system to act as peers that communicate using the same language via simplified, high performance, low latency communication paths that do not incur the translation penalties and software overhead in conventional systems, thus eliminating bottlenecks and increasing efficiency via the unification of communication paths and simplification of software required for processing system/memory system communications. However, one of skill in the art in possession of the present disclosure will recognize that other types of memory fabrics will fall within the scope of the present disclosure as well. Furthermore, the server devices 202, 204, and 206 are illustrated as each coupled to the memory fabric memory system 210 via the switch device 208, one of skill in the art in possession of the present disclosure will recognize that in other embodiments the switch device 208 and the memory fabric memory system 210 may be provided in a server device to enable the functionality described below while remaining within the scope of the present disclosure as well. As such, while a specific networked system 200 has been illustrated and described, one of skill in the art in possession of the present disclosure will recognize that the application image cloning system of the present disclosure may utilize a variety of other components and component configurations while remaining within the scope of the present disclosure as well.

Figure 3:
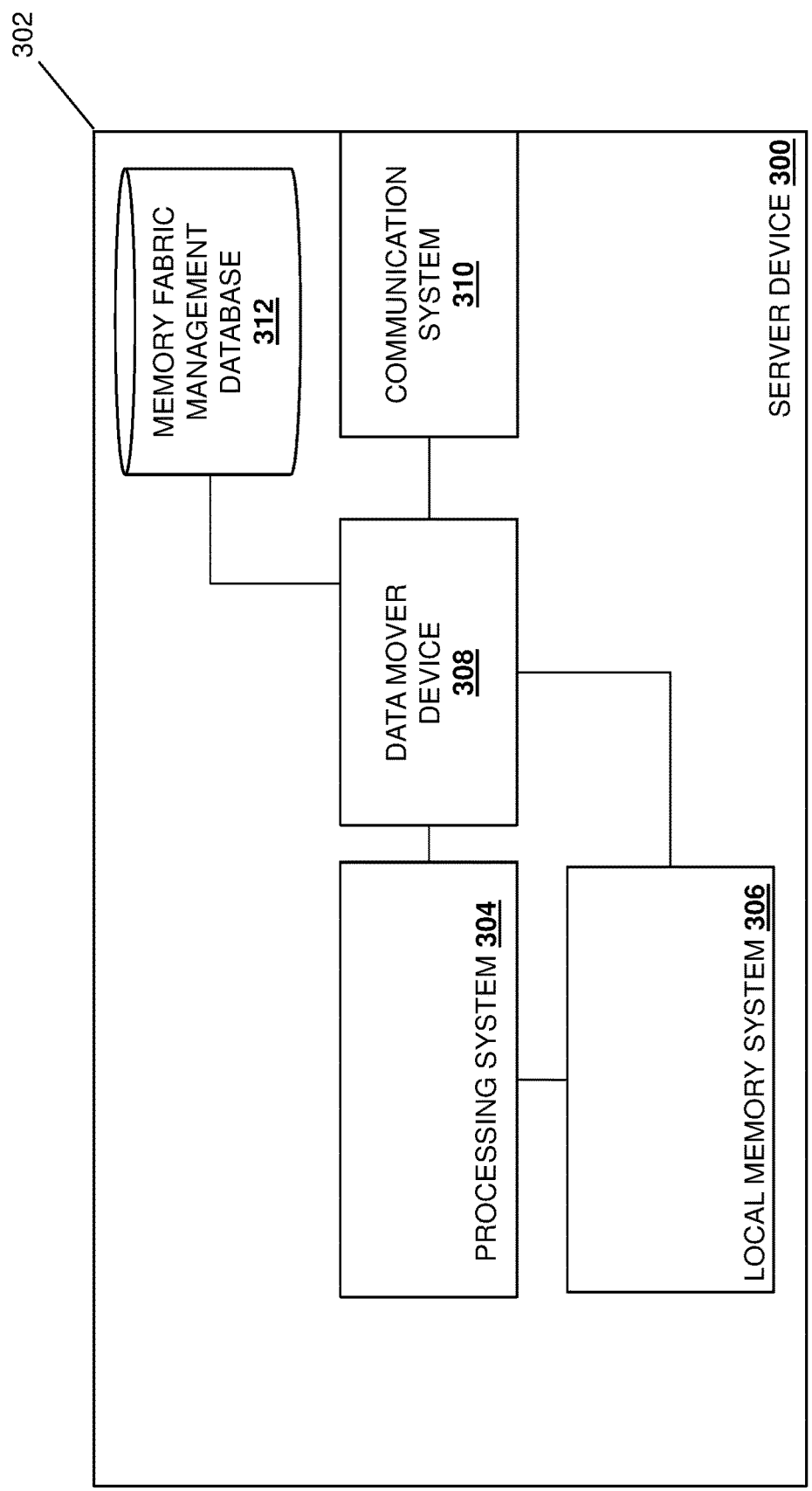
FIG. 3 is a schematic view illustrating an embodiment of a server device that may be included in the networked system of FIG. 2 and that may provide the application image cloning system of the present disclosure.

Referring now to FIG. 3, an embodiment of a server device 300 is illustrated that may provide any of the server devices 202-206 discussed above with reference to FIG. 2. As such, the server device 300 may be provided by the IHS 100 discussed above with reference to FIG. 1 and/or may include some or all of the components of the IHS 100. Furthermore, while illustrated and discussed as a server device 300, one of skill in the art in possession of the present disclosure will recognize that the functionality of the server device 300 discussed below may be provided by other devices that are configured to operate similarly to the server devices discussed below. In the illustrated embodiment, the server device 300 includes a chassis 302 that houses the components of the server device 300, only some of which are discussed below.

For example and as illustrated in FIG. 3, the chassis 302 may house a processing system 304, with the processing system 304 coupled to a local memory system 306. In different embodiments, the processing system 304 may include multiple processing subsystems (e.g., cores in a single processor or Central Processing Unit (CPU)), or may be one of a plurality of different processing systems in the server device 300 (e.g., in multi-processor systems), and/or combinations thereof. Similarly, in different embodiments, the local memory system 306 may be part of a single memory system, provided by different memory systems, and/or combinations thereof. However, while a particular example of a processing system/local memory system configuration is illustrated and described, one of skill in the art in possession of the present disclosure will recognize that a wide variety of processing system/local memory system configurations will benefit from the teachings of the present disclosure as thus will fall within its scope as well. For example, the local memory system 306 may not necessarily be local cache that is local to the processing system 304 or within the chassis 300 but may include memory that is included on the memory fabric memory system 500, described below, that is not visible to other server devices and that helps with isolating particular memory pages.

In some embodiments, the chassis 302 may house a data mover processing system (not illustrated, but which may include the processor 102 discussed above with reference to FIG. 1) and a data mover memory system (not illustrated, but which may include the memory 114 discussed above with reference to FIG. 1) that is coupled to the data mover processing system and that includes instructions that, when executed by the data mover processing system, cause the data mover processing system to provide a data mover device 308 that is configured to perform the functionality of the data mover engines and/or data mover devices discussed below. In the illustrated embodiment, the data mover device 308 is illustrated as separate from the processing system 304 and, as such, may be provided by separate data mover hardware and software (e.g., a Field Programmable Gate Array (FPGA) provided on a Peripheral Component Interconnect express (PCIe) card, and/or other subsystem known in the art) that is coupled to the processing system 304. However, in other embodiments, the data mover device 308 may be integrated with, included in, and/or otherwise part of the processing system 304. As such, in those embodiments, the data mover device 308 may be provided by instructions on a local memory system (e.g., the local memory system 306) in the server device 300 that is utilized by a CPU-independent portion of the processing system 304, provided as an FPGA that is part of the processing system 304, and/or provided in a variety of manners that would be apparent to one of skill in the art in possession of the present disclosure. In some examples, the data mover device 308 may appear to the processing system 304 (e.g., a CPU) as a separate, connected PCIe device (regardless of whether that data mover device 308 is provided separately from or as part of that processing system 304). In specific examples, the data mover device 308 may be provided by an architectural data mover that is configured to perform read, write, copy, and/or other data movement operations for the processing system 304 in order to, for example, relieve the processing system 304 from having to use processing cycles to perform those operations.

In the illustrated embodiment, the chassis 302 houses a communication system 310 that may include a Network Interface Controller (NIC), wireless communication subsystems (e.g., BLUETOOTH®, Near Field Communication (NFC), WiFi, etc.), and/or other communication components that would be apparent to one of skill in the art in possession of the present disclosure. Furthermore, in embodiments of the present disclosure that utilize a memory fabric, the communication system 310 may be configured to provide memory fabric management operations for the server device 300. For example, when the memory fabric is a Gen-Z memory fabric as discussed above, the communication system 310 may include a Gen-Z Memory Management Unit (Gen-Z ZMMU) that, in the example provided below, operates as a Gen-Z ZMMU requester that provides access for the processing system 304 to the Gen-Z memory fabric (e.g., in cooperation with a Gen-Z ZMMU responder in the memory fabric memory system 210). However, one of skill in the art in possession of the present disclosure will recognize that other memory fabric management subsystems for other memory fabrics may be utilized with the teachings of the present disclosure while remaining within its scope as well.

The chassis 302 may also house a storage system (not illustrated, but which may include the storage 108 discussed above with reference to FIG. 1) that is coupled to the data mover device 308 (e.g., via a coupling between the storage system and the data mover processing system) as well as to the communication system 310, and that includes a memory fabric management database 312 that is configured to store any of the information (e.g., the memory fabric reference pointers, memory fabric page ownership information, mapping information, etc.) utilized by the data mover device 308 and/or the communication system 310 discussed below. While a specific server device 300 has been illustrated, one of skill in the art in possession of the present disclosure will recognize that server devices (or other devices operating according to the teachings of the present disclosure in a manner similar to that described below for the server device 300) may include a variety of components and/or component configurations for providing conventional server device functionality, as well as the functionality discussed below, while remaining within the scope of the present disclosure as well.

Figure 4:
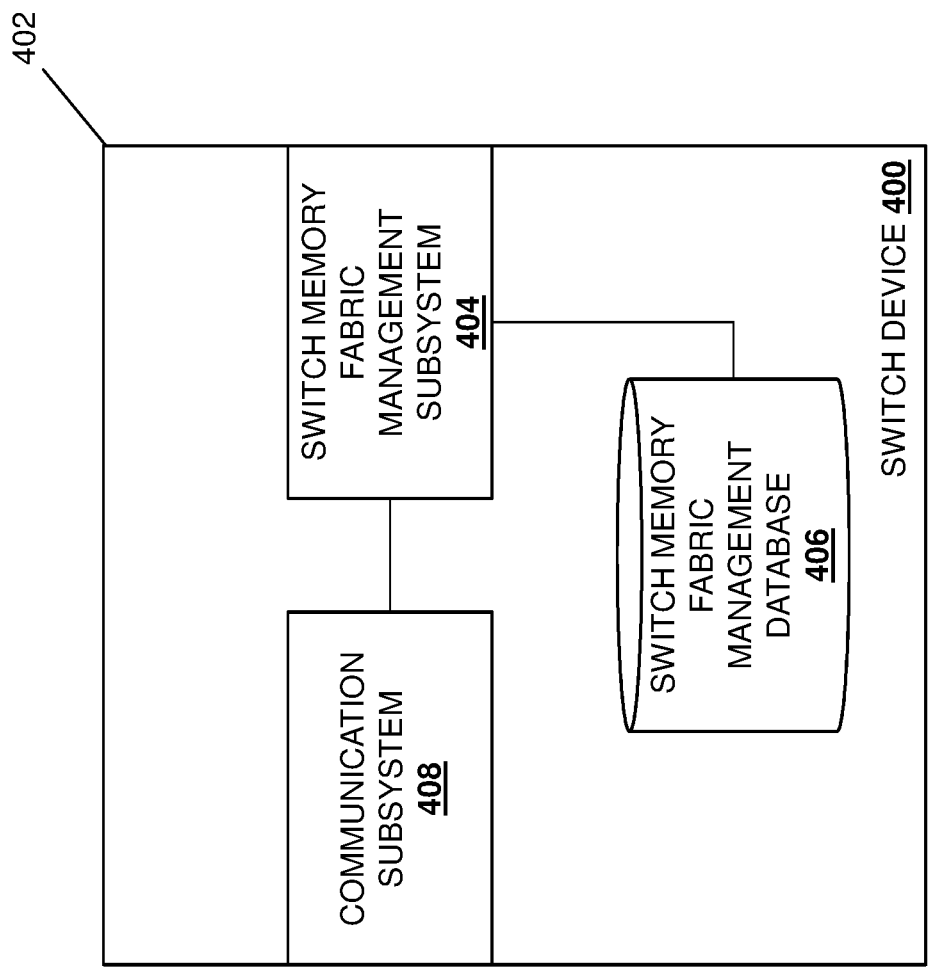
FIG. 4 is a schematic view illustrating an embodiment of a switch device that may be included in the networked system of FIG. 2.

Referring now to FIG. 4, an embodiment of a switch device 400 is illustrated that may provide the switch device 208 discussed above with reference to FIG. 2. As such, the switch device 400 may be provided by the IHS 100 discussed above with reference to FIG. 1 and/or may include some or all of the components of the IHS 100, and in specific examples may be provided by a Gen-Z switch device as discussed above. Furthermore, while illustrated and described as a switch device 400, one of skill in the art in possession of the present disclosure will recognize that the functionality of the switch device 400 discussed below may be provided by other devices (e.g., the bridge devices discussed above) that are configured to operate in a similar manner. In the illustrated embodiment, the switch device 400 includes a chassis 402 that houses the components of the switch device 400, only some of which are illustrated below. In the illustrated embodiment, the chassis 402 houses a memory fabric management subsystem 404 that is configured to provide memory fabric management operations for the switch device 400.

For example, when the memory fabric is a Gen-Z memory fabric as discussed above, the memory fabric management subsystem 404 may include a Gen-Z Memory Management Unit (Gen-Z ZMMU) that, in the example provided below, operates to enable access for the server devices 202, 204, and 206 of FIG. 2 to the Gen-Z memory fabric by augmenting Gen-Z ZMMU requester operations, managing all the Gen-Z ZMMUs in the networked system 200, and/or performing other Gen-Z ZMMU operations that would be apparent to one of skill in the art in possession of the present disclosure. In some specific examples, the switch device 400 may operate to hide the hierarchy of Gen-Z ZMMUs behind it by, for example, operating as both a Gen-Z ZMMU requester and a Gen-Z ZMMU responder. As such, when the Gen-Z ZMMU(s) provided by the switch device 400 have been programmed, each server device 202, 204, and 206 may discover Gen-Z memory fabric access (e.g., via a Gen-Z "aperture") during the boot process, and map ZMMU memory space to their system physical address space, with the BIOS, firmware, and operating system in each of those server devices performing ZMMU address space discovery. Following that discovery, the operating system may implement a memory manager (e.g., using a CPU MMU) in order to allocate memory (e.g., using MMU page size chunks) to applications (e.g., a ZMMU aperture may be allocated by the memory fabric management subsystem 404, with the individual MMU pages accessible via that ZMMU aperture allocated to the application(s) by server device operating systems). However, one of skill in the art in possession of the present disclosure will recognize that other memory fabric management subsystems for other memory fabrics may be utilized with the teachings of the present disclosure while remaining within its scope as well.

The chassis 402 may also house a storage system (not illustrated, but which may include the storage 108 discussed above with reference to FIG. 1) that is coupled to the memory fabric management subsystem 404 (e.g., via a coupling between the storage system and the memory fabric management subsystem 404) and that includes a memory fabric management database 406 that is configured to store any of the information (e.g., the memory fabric reference pointers, memory fabric page ownership information, etc.) utilized by the memory fabric management subsystem 404 discussed below. In the illustrated embodiment, the chassis 402 also houses a communication subsystem 408 that is coupled to the memory fabric management subsystem 404 and that may be provided by a Network Interface Controller (NIC), wireless communication components (e.g., Wifi components, BLUETOOTH components, Near Field Communication (NFC) components, etc.), and/or any other communication subsystems that would be apparent to one of skill in the art in possession of the present disclosure. While a specific switch device 400 has been illustrated, one of skill in the art in possession of the present disclosure will recognize that switch devices (or other devices operating according to the teachings of the present disclosure in a manner similar to that described below for the switch device 400) may include a variety of components and/or component configurations for providing conventional switch device functionality, as well as the functionality discussed below, while remaining within the scope of the present disclosure as well.

Figure 5:
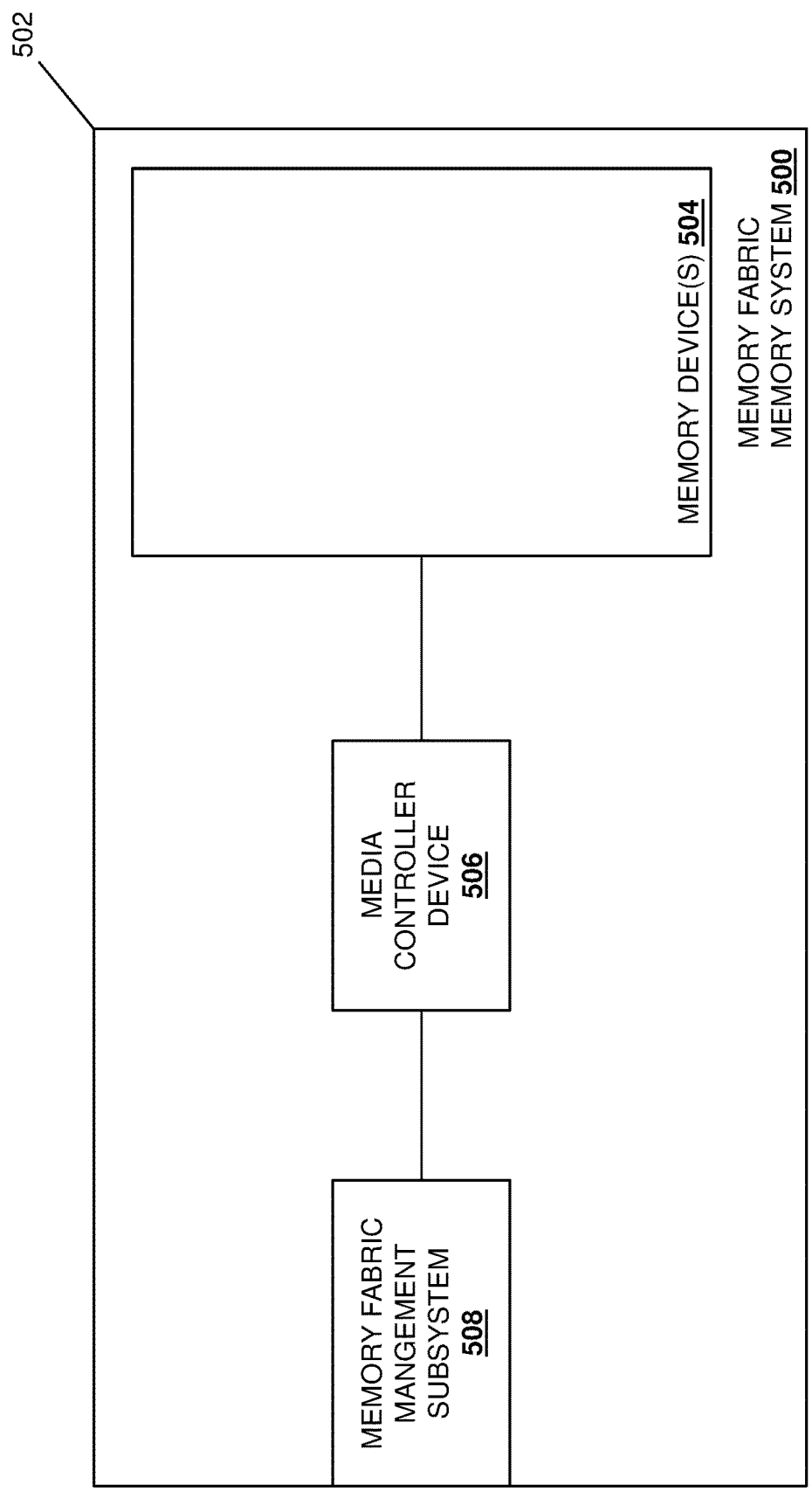
FIG. 5 is a schematic view illustrating an embodiment of a memory system that may be included in the networked system of FIG. 2.

Referring now to FIG. 5, an embodiment of a memory fabric memory system 500 is illustrated that may provide memory fabric memory system 210 discussed above with reference to FIG. 2. As such, the memory fabric memory system 500 may be provided by the IHS 100 discussed above with reference to FIG. 1 and/or may include some or all of the components of the IHS 100, and in specific examples may be provided by one or more separate server devices, logical portion(s) of one or more of the server devices 202, 204, and 206, and/or in a variety of other manners that would be apparent to one of skill in the art in possession of the present disclosure. Furthermore, while illustrated and discussed as a memory system, one of skill in the art in possession of the present disclosure will recognize that the functionality of the memory system discussed below may be provided by other devices that are configured to operate similarly as discussed below. In the illustrated embodiment, the memory fabric memory system 500 includes a chassis 502 that houses the components of the memory fabric memory system 500, only some of which are illustrated below.

For example, the chassis 502 may house one or more memory devices 504 that may be provided by Dynamic Random Access Memory (DRAM) devices, Storage Class Memory (SCM) devices, Solid State Drive (SSD) device arrays, and/or any other memory device that would be apparent to one of skill in the art in possession of the present disclosure. In the illustrated embodiment, the chassis 502 houses a media controller device 506 that is coupled to the memory device(s) 504. While illustrated as a single media controller device 506 coupled to one or more memory device(s) 504, one of skill in the art in possession of the present disclosure will recognize that multiple media controller devices may be provided for the memory device(s) 504 while remaining within the scope of the present disclosure as well. For example, a separate media controller device may be provided for each memory device technology (e.g., a first media controller device may be provided for DRAM devices, a second media controller device may be provided for SCM devices, etc.) However, while a few specific examples of memory devices and media controller devices have been provided, one of skill in the art in possession of the present disclosure will recognize that a wide variety of memory device and/or media controller device components and/or configurations will fall within the scope of the present disclosure as well.

In the illustrated embodiment, the chassis 502 houses a memory fabric management subsystem 508 that is configured to provide memory fabric management operations for the memory fabric memory system 500. For example, when the memory fabric is a Gen-Z memory fabric as discussed above, the memory fabric management subsystem 508 may include a Gen-Z Memory Management Unit (Gen-Z ZMMU) that, in the example provided below, operates as a Gen-Z ZMMU responder that operates with Gen-Z ZMMU requester(s) that provide access for the processing systems 202a, 204a, and 206a to the Gen-Z memory fabric. However, one of skill in the art in possession of the present disclosure will recognize that other memory fabric management subsystems for other memory fabrics may be utilized with the teachings of the present disclosure while remaining within its scope as well. While a specific memory fabric memory system 500 has been illustrated, one of skill in the art in possession of the present disclosure will recognize that memory systems (or other systems operating according to the teachings of the present disclosure in a manner similar to that described below for the memory fabric memory system 500) may include a variety of components and/or component configurations for providing conventional memory system functionality, as well as the functionality discussed below, while remaining within the scope of the present disclosure as well.

Figure 6:
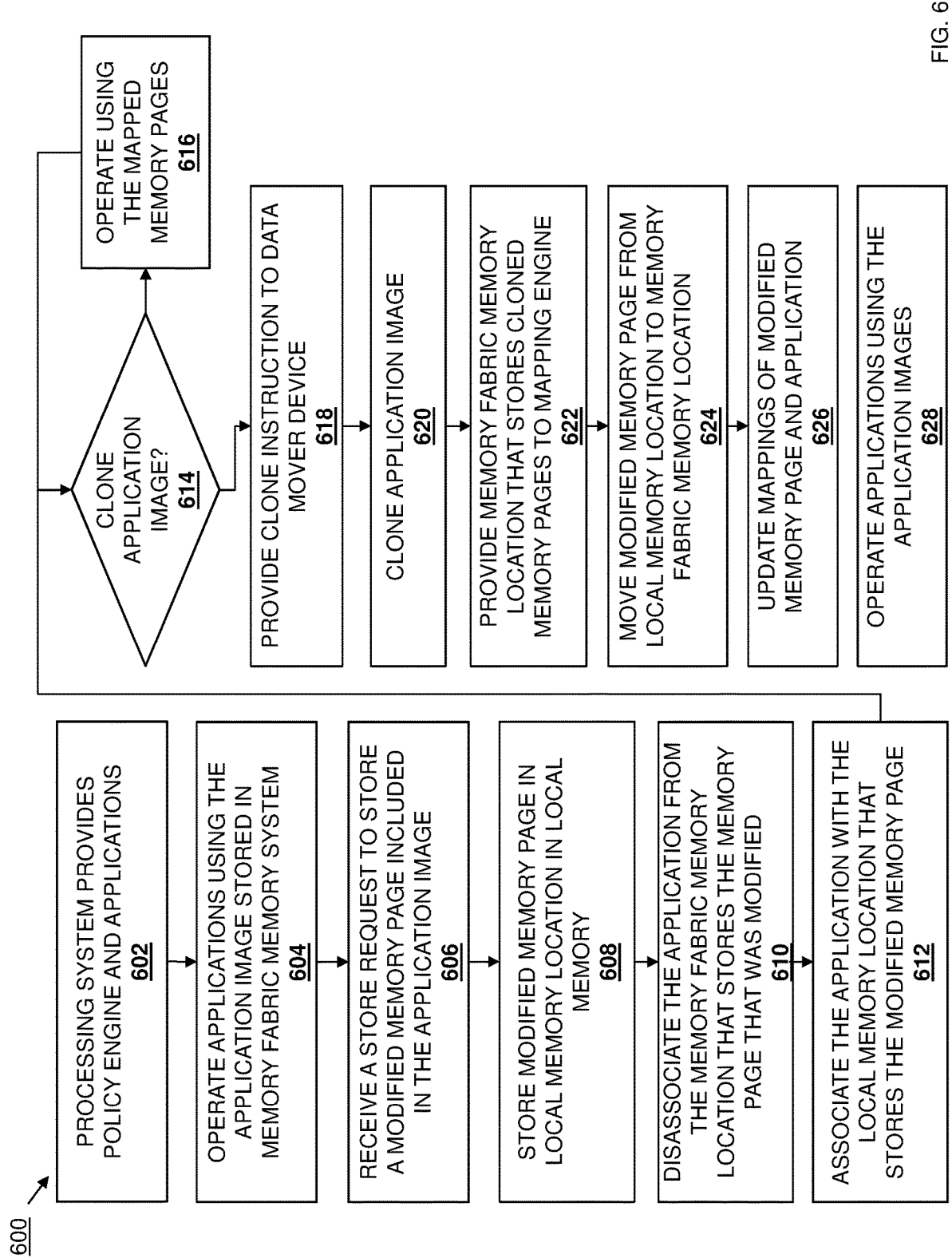
FIG. 6 is a flow chart illustrating an embodiment of a method for cloning application images.

Referring now to FIG. 6, an embodiment of a method 600 for cloning application images is illustrated. As discussed below, the systems and methods of the present disclosure include a processing system in a server device that provides a plurality of applications using an application image that is stored in a memory fabric memory system, with the plurality of applications configured to utilize a mapping engine to access application data that is stored in the application image. The mapping engine may maintain mappings of applications to memory pages included in the application image, and the memory pages may be stored in memory fabric memory locations included in the memory fabric memory system. The mapping engine may load memory pages from the memory fabric memory system into an application included in the plurality of applications in response to receiving a load request from that application for those memory pages, and when an application provides the mapping engine a store request that modifies application information included in a memory page in the application image, the mapping engine will store the corresponding modified memory page in a local memory system in the server device. The mapping engine will then change a mapping for that application by disassociating that application from the memory fabric memory location that stores the memory page, and associating the application with the local memory system in which the modified memory page was stored, while maintaining mappings for the remaining applications included in the plurality of applications to the memory fabric memory location that stores the original memory page included in the application image. As such, by mapping applications to memory fabric memory locations that store the memory pages included in the application image, and mapping applications to local memory locations that store modified memory pages, cloned application images for the application image are not required, which reduces copy intensive operations required to generate such cloned application images.

In some situations, the mapping engine may determine that a predetermined condition exists that provides for the generation of a cloned application image after storing the modified memory page(s) in the local memory system in the server device. For example, when the application requires bulk data copies, the mapping engine may cause a data mover device to clone the application image in the memory fabric memory system and move the modified memory page to the cloned application image, which allows the application associated with the modified memory page to operate off of its own copy of the application image with the modified memory page, while the remaining applications included in the plurality of applications may operate using the original, unmodified application image. As such, an application image cloning system is provided that optimizes application image cloning by only providing a cloned application image when it is more efficient to do so, while providing a mechanism to modify memory pages included in the application image without having to generate a cloned application image.

Figure 7A:
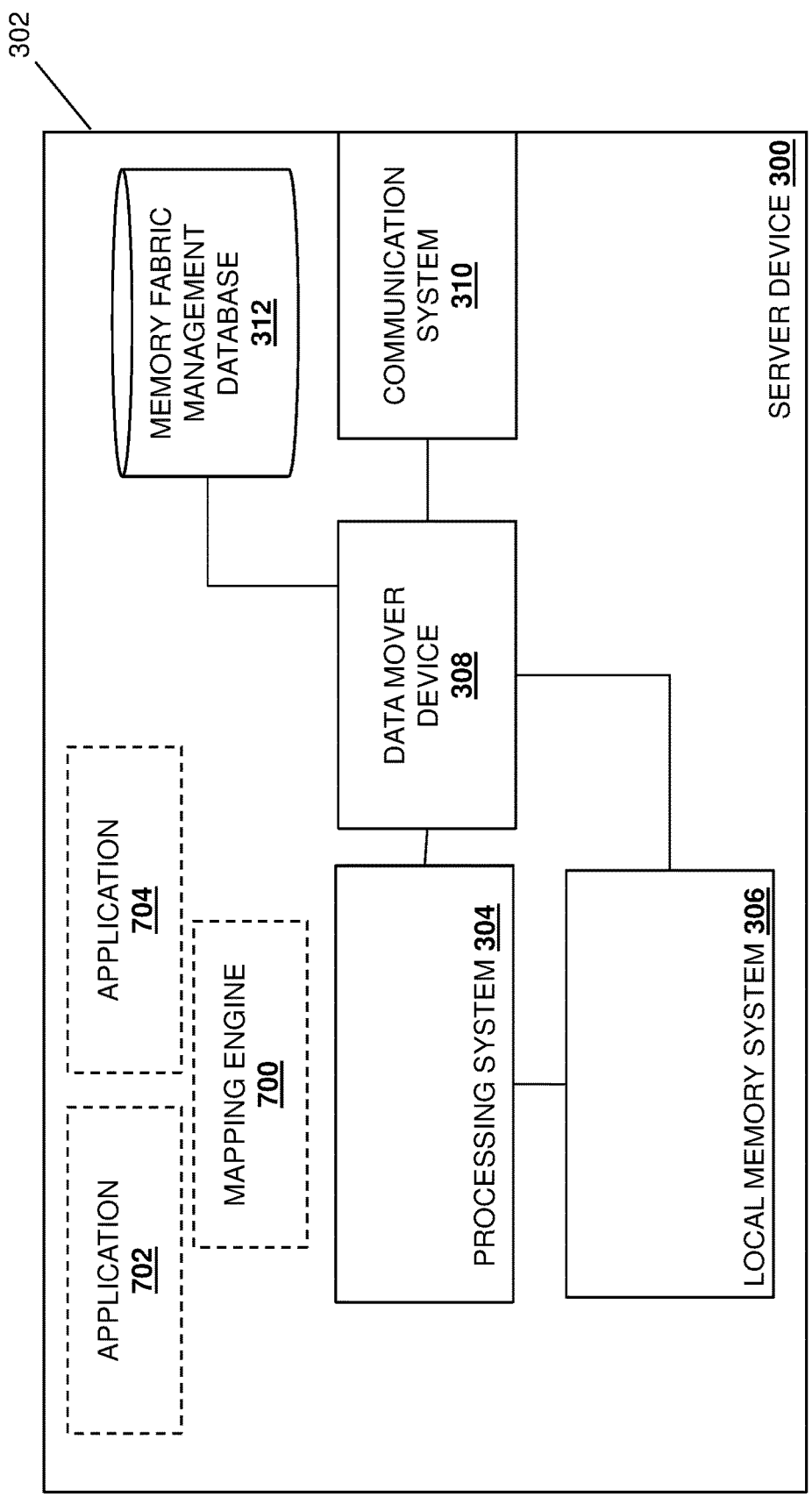
FIG. 7A is a schematic view illustrating an embodiment of the server device of FIG. 3 operating during the method of FIG. 6.

The method 600 begins at block 602 where a processing system provides a mapping engine and a plurality of applications. As illustrated in FIG. 7A, in an embodiment of block 602, the processing system 304 in the server device 300 may operate to provide a mapping engine 700. For example, the processing system 304 may execute instructions stored on the local memory system 306 in order to provide the mapping engine 700, although other methods for providing mapping engines that function as described below will fall within the scope of the present disclosure as well. In a specific example, the mapping engine 700 may be included as part of a kernel (e.g., an operating system kernel) provided by the processing system 304 and, as such, may operate as part of the core of an operating system provided for the server device 300 that is one of the first programs loaded upon initialization of the server device 300, that has control over any of the subsystems in the server device 300 and performs operations such as completing initialization operations for the server device 300, handling input/output requests from software/applications provided on the server device 300, translating input/output requests into data processing instructions for the processing system 304, handling memory subsystems and peripheral devices, and/or performing a variety of other kernel operations that would be apparent to one of skill in the art in possession of the present disclosure. However, while described as being provided in a kernel subsystem, the mapping engine 700 may be provided in a hypervisor subsystem and/or other subsystems that one of skill in the art in possession of the present disclosure would recognize as having privilege levels that allow it to access the components of the server device 300 in the manner discussed below.

Figure 7B:
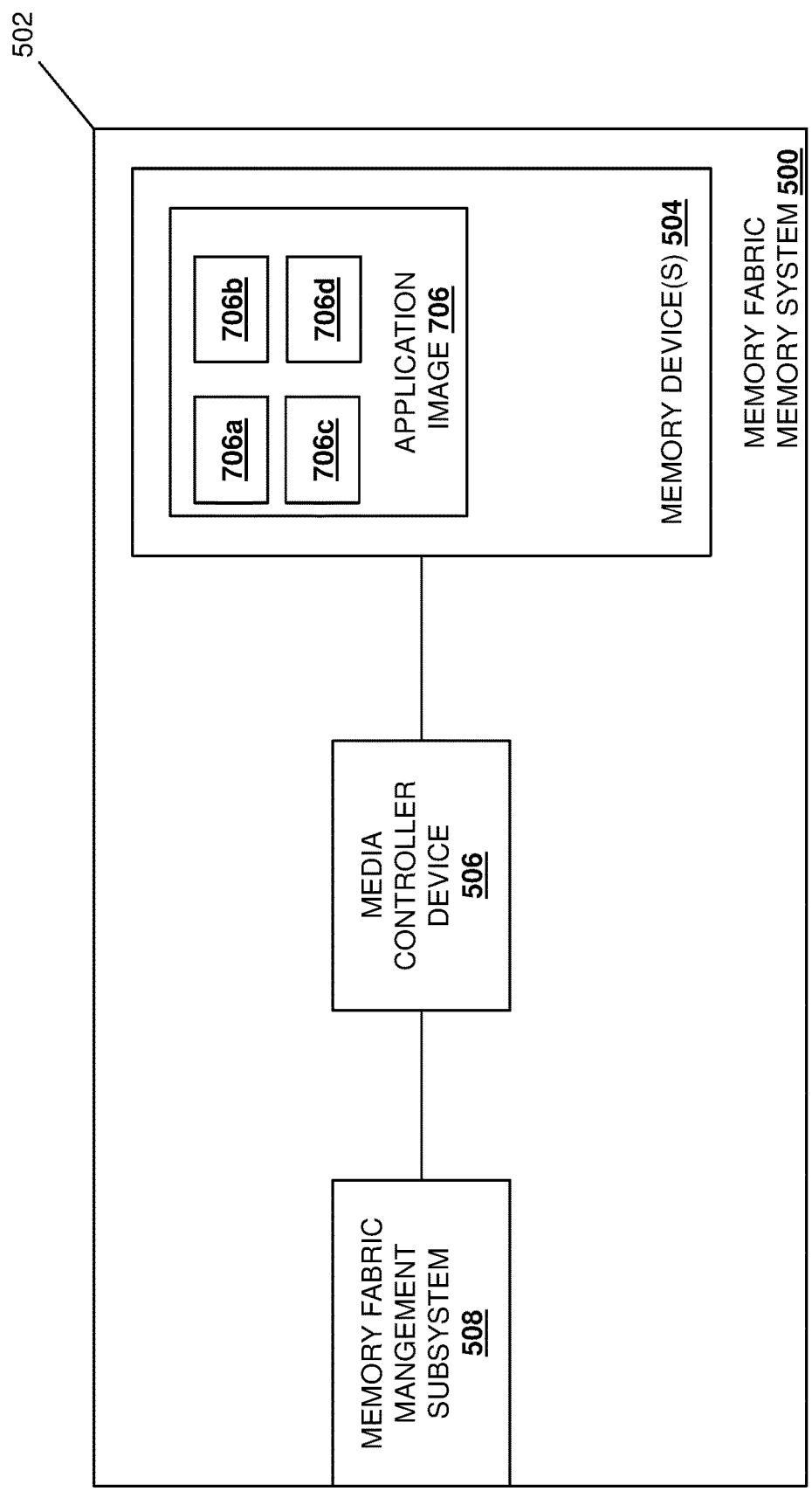
FIG. 7B is a schematic view illustrating an embodiment of the memory system of FIG. 5 operating during the method of FIG. 6.

As illustrated in FIG. 7A, in an embodiment of block 602, the processing system 304 in the server device 300 may also operate to provide an application 702 and an application 704. As discussed below, the processing system 304 may utilize application information stored on a memory fabric (e.g., provided by the memory fabric memory system 500, the local memory system 306, and/or any other memory that is accessible to the processing system 304 and part of the memory fabric) in order to provide the applications 702 and/or 704. In some examples, the processing system 304 may utilize application information directly from the memory fabric to provide the application, while in other examples, subsystems may be provided that synchronize application information between the local memory system 306 and/or processing system 304 (e.g., processor registers) and the memory fabric. For example, and as illustrated in FIG. 7B, the processing system 304 may execute instructions provided by an application image 706 stored in the memory device 504 included in the memory fabric memory system 500 to provide at least a portion of the application 702 and the application 704. In a specific example, the application image 706 may be a "golden" image of an application (e.g., a "golden" virtual machine image, a "golden" operating system image, etc.) that the processing system 304 can leverage to provide multiple instances of that application for different uses. In conventional system, the application image 706 may be cloned for each application instance that is provided in order to prevent modification of the "golden" image. For example, in conventional systems, a first cloned application image may be created for the application 702 from the application image 706, and a second cloned application image may be created for the application 704 from the application image 706, such that any changes made by those applications 702 and 704 to their respective cloned application images will not result in changes to the application image 706 (i.e., "golden" image), as the application image 706 may be stored in a persistent memory device included in the memory device 504 (e.g., an SCM device), making any changes permanent.

In some embodiments, the application image 706 may include a plurality of memory pages that include application data for utilization with the application image. For example, the application image 706 may include a memory page 706a, a memory page 706b, a memory page 706c, and/or up to a memory page 706d. in some examples, each memory page 706a-706d may be stored at a respective memory fabric memory location (e.g., a memory address space) included in the memory device(s) 504. In embodiments in which the processing system 304 provides the application 702 and the application 704 using the application image 706, the mapping engine 700 may map each application 702 and 704 to the memory pages 706a-706d, and may store those mappings in the memory fabric management database 312. For example, the mapping engine 700 may maintain a mapping of virtual-machine-memory-addresses-to-physical-memory-addresses in the memory fabric memory device(s) 504 in the memory fabric memory system 500, which allows the application 702 and/or 704 (e.g., virtual machines) to access the data provided by the application image 706 via a virtual machine data memory address space that is referenced by the applications 702 and 704.

While examples of for the providing of applications have been described, other methods for providing applications that function as described below will fall within the scope of the present disclosure as well. In particular, the application 702 may be provided as a separate subsystem in the server device 300 from the mapping engine 700 and/or the subsystem that provides that mapping engine 700 (e.g., the kernel subsystem or hypervisor subsystem discussed above). In another example, the application 702 may be provided by the processing system 304, while the application 704 may be provided by another processing system housed in the same server device (e.g., two processing systems included in the server device 202), and/or a processing system included in different server devices (e.g., a processing system included in the server device 202 may provide the application 702, and a processing system included in the server device 204 or up to 206 may provide the application 704 and/or other applications). In such situations, the mapping engine 700 may be provided by a management server device, the switch device 208, and/or across the various processing systems included in the server devices 202, 204, and/or 206. While the example of the method 600 provided herein focuses on the operations and functioning of the server device 202/300, one of skill in the art in possession of the present disclosure will recognize that any the server devices 204 and up to 206 may function in a similar manner while remaining within the scope of the present disclosure as well.

Figure 8A:
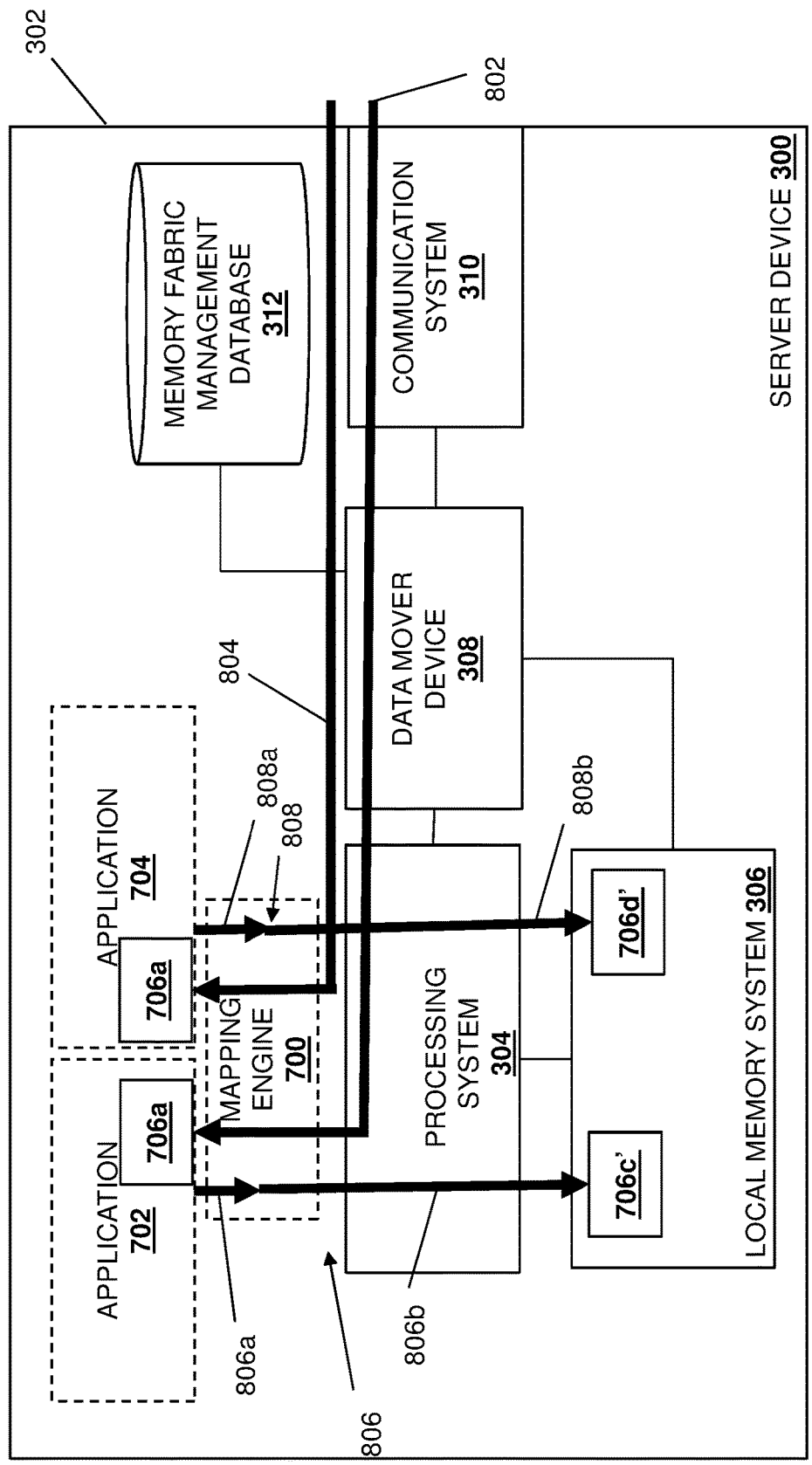
FIG. 8A is a schematic view illustrating an embodiment of the server device of FIG. 3 operating during the method of FIG. 6.
Figure 8B:
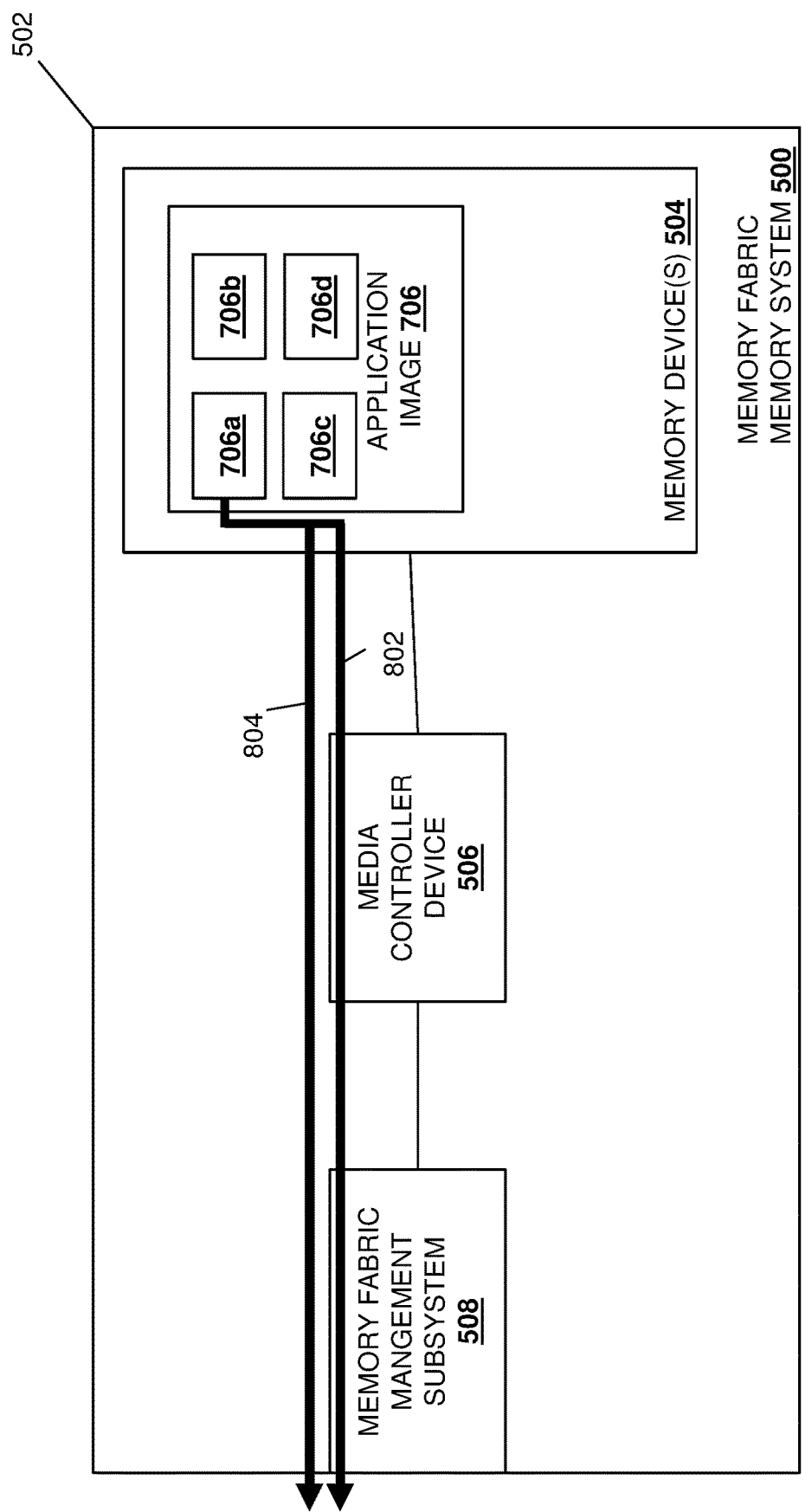
FIG. 8B is a schematic view illustrating an embodiment of the memory system of FIG. 5 operating during the method of FIG. 6.

The method 600 then proceeds to block 604 where the plurality of applications operate using the application image stored in the memory fabric memory system. As illustrated in FIGS. 8A and 8B, in an embodiment of block 604, the application 702 may operate to perform application operations that generate application memory fabric communications 802. For example, the application 702 may generate and transmit load requests via the mapping engine 700 and the communication system 310 in the server device 300, through the switch device 208, and to the memory fabric memory system 500 to load the memory page 706a that is stored in a memory fabric memory location that is included in the memory fabric memory system 500. In various embodiments, the data mover device 308 may assist in loading the memory page 706 by allowing access to the memory fabric memory system 500 via its MMIO apertures. For example, the mapping engine 700 may receive, from the application 702, a load request to load the application information provided by the memory page 706a. The mapping engine 700 may determine, based on notational reference information included in the memory fabric management database 312, that a memory fabric memory location that stores the memory page 706a is associated with the application 702. For example, the memory fabric management database 312 may include mappings in that may include reference pointers to the memory fabric memory location in which the memory page 706a is stored, and thus the application memory fabric communications 802 generated by the application operations may cause the memory page 706a (which is used, at least in part, to provide the application 702) to be provided for use with the application 702.

Similarly, the application 704 may operate to perform application operations that generate application memory fabric communications 804. For example, the application 704 may generate and transmit load requests via the mapping engine 700 and the communication system 310 in the server device 202/300, through the switch device 208, and to the memory fabric memory system 500 to load the memory page 706a that is stored in a memory fabric memory location that is included in the memory fabric memory system 500. For example, the mapping engine 700 may receive, from the application 704, a load request to load the application information provided by the memory page 706a. The mapping engine 700 may determine, based on notational reference information included in the memory fabric management database 312, that a memory fabric memory location that stores the memory page 706a is associated with the application 704. For example, the memory fabric management database 312 may include mappings that may include reference pointers to the memory fabric memory location in which the memory page 706a is stored, and thus the application memory fabric communications 802 generated by the application operations may cause the memory page 706a (which is used, at least in part, to provide the application 704) to be provided for use with the application 704. As such, the application 702 and the application 704 may "share" the application image 706 by loading the various memory pages 706a, 706b, 706c, and/or 706d from the memory fabric memory system 210.

The method 600 then proceeds to block 606 where a store request is received to store a modified memory page that is a modified version of a memory page included in the plurality of memory pages. As illustrated in FIG. 8A, in an embodiment of block 606, the application 702 may operate to perform application operations that generate application local memory communications 806. The application 702 may generate and transmit store requests to the mapping engine 700 to store a modified memory page. In the illustrated example, the application 702 may provide a store request 806a to the mapping engine 700 to store a modified memory page 706c', which may be a modified version of the memory page 706c that is included in the application image 706 and that is stored in a memory fabric memory location included in the memory device(s) 504 in the memory fabric memory system 500. In a specific example, the application 702 may perform an update, an install, a configuration change, and/or any other modification known in the art to the memory page 706c in order to generate the modified memory page 706c'. While the example illustrates the memory page 706c being modified to provide memory page 706c', one of skill in the art will recognize that any of the memory pages 706a, 706b, and/or up to 706d may be modified by the application 702 while remaining within the scope of the present disclosure as well.

Similarly, the application 704 may operate to perform application operations that generate application local memory communications 808. For example, the application 704 may generate and transmit store requests to the mapping engine 700 to store a modified memory page. In the illustrated example, the application 702 may provide a store request 808a to the mapping engine 700 to store a modified memory page 706d', which may be a modified version of the memory page 706d that is included in the application image 706 and that is stored in a memory fabric memory location included in the memory device(s) 504 in the memory fabric memory system 500. In a specific example, the application 704 may perform an update, an install, a configuration change, and/or any other modification known in the art to the memory page 706d in order to generate the modified memory page 706d'. While the example illustrates memory page 706d being modified to provide memory page 706d', one of skill in the art will recognize that any of the memory pages 706a, 706b, and/or up to 706d may be modified by the application 704 while remaining within the scope of the present disclosure as well.

The method 600 then proceeds to block 608 where the modified memory page is stored in a local memory location in a local memory system. As illustrated in FIG. 8A, in an embodiment of block 608 and in response to receiving the store request to store a memory page, the mapping engine 700 may store the modified memory page in the local memory system 306. For example, in response to receiving the store request 806a from the application 702, the mapping engine 700 may perform a store operation 806b to store the modified memory page 706c' in a local memory location in the local memory system 306. Similarly, in response to receiving the store request 806b from the application 704, the mapping engine 700 may perform a store operation 808b to store the modified memory page 706d' in a local memory location in the local memory system 306.

The method 600 then proceeds to block 610 where notational reference information in the memory fabric management database is modified in order to disassociate the application from the memory fabric memory location that stores the original memory page that was modified by the application. In an embodiment of block 610, the mapping engine 700 may modify the notational reference information in the memory fabric management database 312 to disassociate the application 702 from the memory fabric memory location that stores the memory page 706c. For example, subsequent to the storage of the modified memory page 706c' in the local memory system 306, the application 702 may be configured to utilize that memory page 706c' instead of the memory page 706 by, for example, the mapping engine 700 modifying the notational reference information in the memory fabric management database 312 to disassociate the application 702 from the memory page 706c. Similarly, the mapping engine 700 may modify the notational reference information in the memory fabric management database 312 to disassociate the application 704 from the memory fabric memory location that stores the memory page 706d. For example, subsequent to the storage of the modified memory page 706d' in the local memory system 306, the application 704 may be configured to utilize that memory page 706d' instead of the memory page 706d by, for example, the mapping engine 700 modifying the notational reference information in the memory fabric management database 312 to disassociate the application 702 from the memory page 706d.

The method 600 then proceeds to block 612 where notational reference information in the memory fabric management database is modified in order to associate the application with the local memory location that stores the modified memory page. In an embodiment of block 612, the mapping engine 700 may modify the notational reference information in the memory fabric management database 312 to associate the application 702 with the local memory location in the local memory system 306 that stores the modified memory page 706c'. As such, any load request for the memory page 706c' by the application 702 may cause the mapping engine 700 to load the modified memory page 706c' from its local memory location in the local memory system 306, instead of loading the memory page 706c stored in its memory fabric memory location in the memory fabric memory system 500. As such, the mapping engine 700 maintains a mapping that associates the application 702 with the modified memory page 706c' in the local memory location in the local memory system 306, as well as with the memory pages 706a, 706b and 706d that are stored in respective memory fabric memory locations in the memory fabric memory system 500.

Similarly, the mapping engine 700 may modify the notational reference information in the memory fabric management database 312 to associate the application 704 with the local memory location in the local memory system 306 that stores the modified memory page 706d'. As such, any load request for the memory page 706d' by the application 704 cause the mapping engine 700 to load the modified memory page 706d' from its local memory location in the local memory system 306, instead of loading the memory page 706d stored in its memory fabric memory location in the memory fabric memory system 500. As such, the mapping engine 700 maintains a mapping that associates the application 704 with the modified memory page 706d' in the local memory location in the local memory system 306, as well as with the memory page 706a, 706b and 706c that are stored in respective memory fabric memory locations in the memory fabric memory system 210. Thus, the mapping engine 700 may operate to store modified versions of the memory pages included in the application image 706, which as discussed above may be a "golden" image, in the local memory system 306. As such, conventional application cloning of the application image 706 is not required for each application with which that application image will be utilized.

Figure 9A:
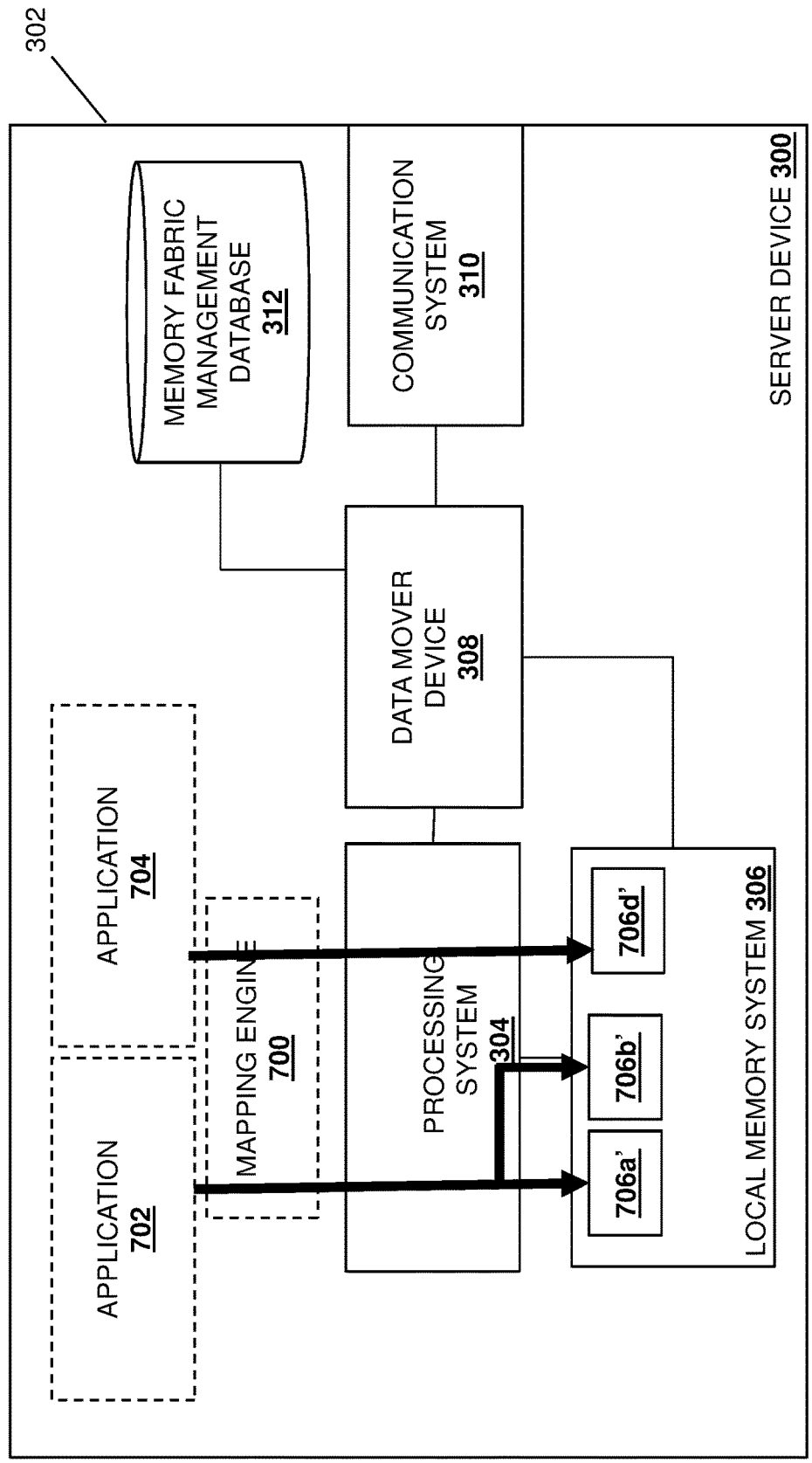
FIG. 9A is a schematic view illustrating an embodiment of the server device of FIG. 3 operating during the method of FIG. 6.
Figure 9B:
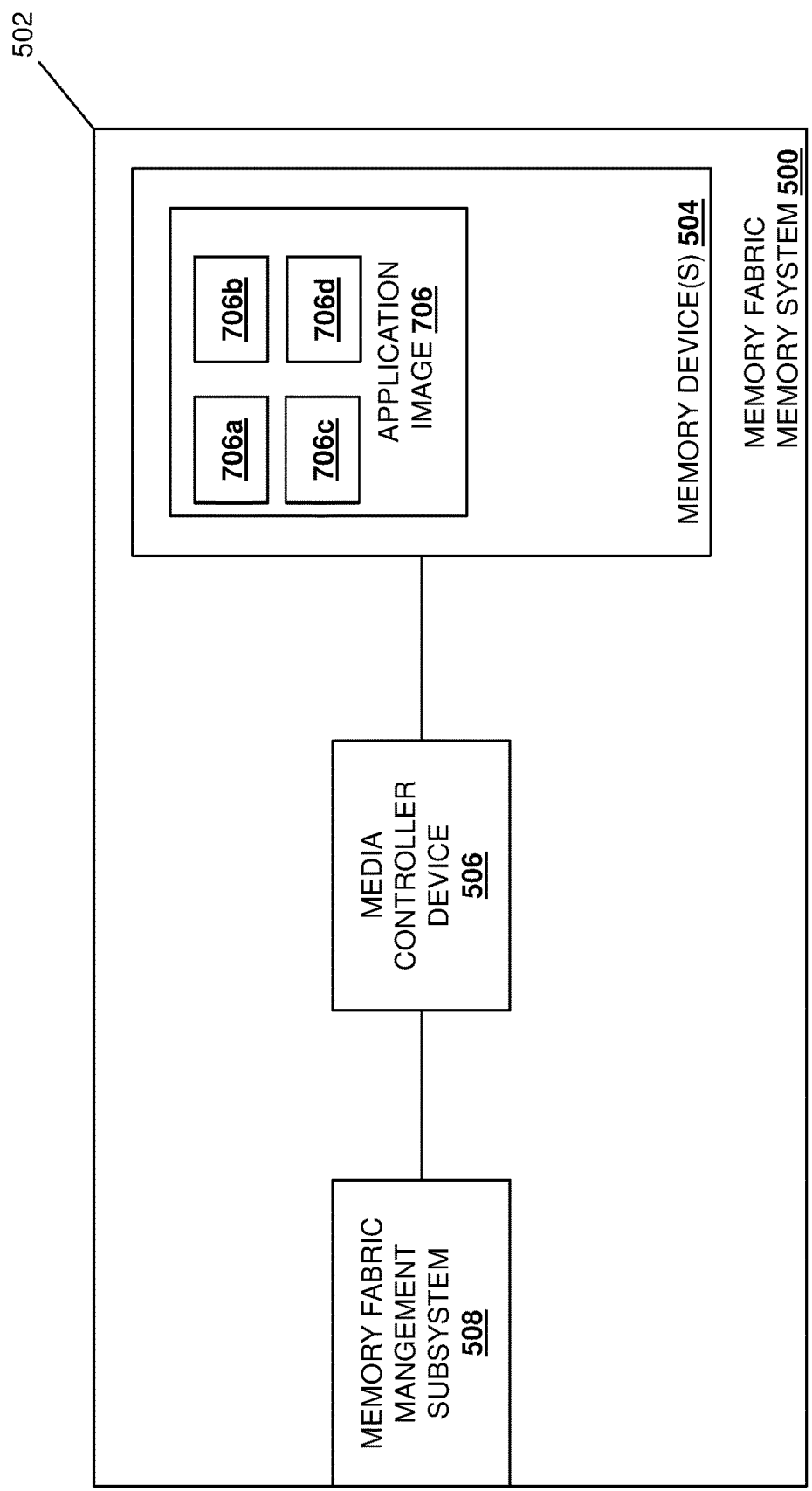
FIG. 9B is a schematic view illustrating an embodiment of the memory system of FIG. 5 operating during the method of FIG. 6.

The method 600 then proceeds to decision block 614 where it is determined whether a cloned application image is needed. As illustrated in FIG. 9A and FIG. 9B, in an embodiment of decision block 614, the mapping engine 700 may determine whether the modified memory page that is stored in the local memory location in the local memory system should be stored in the memory fabric memory system. For example, using the techniques discussed above, the application 702 may be associated with modified memory pages 706a' and 706b' that are stored in local memory locations in the local memory system 306, as well as with the memory pages 706c and 706d that are included in the application image 706 and that are stored in memory fabric memory locations in the memory fabric memory system 210. Similarly, the application 704 may be associated with the modified memory page 706d' that is stored in a local memory location in the local memory system 306, as well as with the memory pages 706a, 706b, and 706c that are included in the application image 706 and that are stored in memory fabric memory locations in the memory fabric memory system 210. Thus, each of memory pages 706a', 706b' and 706d' may have been stored in the local memory system 306 according to iterations of blocks 606-612 of method 600. In embodiments of decision block 614, the mapping engine 700 may make a determination that a predetermined cloning condition has been satisfied for application 702 that provides for the movement of the modified memory pages 706a' and 706b' associated with the application 702 to be moved from the local memory system 306 to the memory fabric memory system 500. For example, the predetermined cloning condition may be satisfied when a threshold number of modified memory pages are stored in the local memory system 306 for a given application, when an application is performing a relatively heavy workload that requires a threshold portion of the application image 706 at any given time, and/or for any other cloning condition that would be apparent to one of skill in the art in possession of the present disclosure. In some embodiments, a predetermined condition need not exist as a user may decide to provide a command to clone the application image.

If, at decision block 614, it is determined that the cloned application image is not needed, then the method 600 may proceed to block 616 where the plurality of applications operate using the memory pages that are included in the application image and that are stored in the memory fabric memory system and/or the local memory system. As illustrated in FIGS. 9A and 9B, in an embodiment of block 616, if there is no determination that the modified memory page that is stored in the local memory location in the local memory system 306 should be stored in the memory fabric memory system 500, the application 702 may operate to perform application operations that generate application memory fabric communications. For example, the application 702 may generate and transmit load requests via the mapping engine 700 to load the memory page 706a' and/or the memory page 706b' stored in the local memory locations that are included in the local memory system 306, and/or load the memory page 706c and/or the memory page 706d that are stored in the memory fabric memory locations that are included in the memory fabric memory system 500. Similarly, the application 704 may generate and transmit load requests via the mapping engine 700 to load the memory page 706d' that is stored in the local memory location that is included in the local memory system 306, and/or load the memory page 706a, the memory page 706b, and/or the memory page 706c that are stored in the memory fabric memory locations that are included in the memory fabric memory system 500. The method 600 may the proceed back to decision block 614.

Figure 10A:
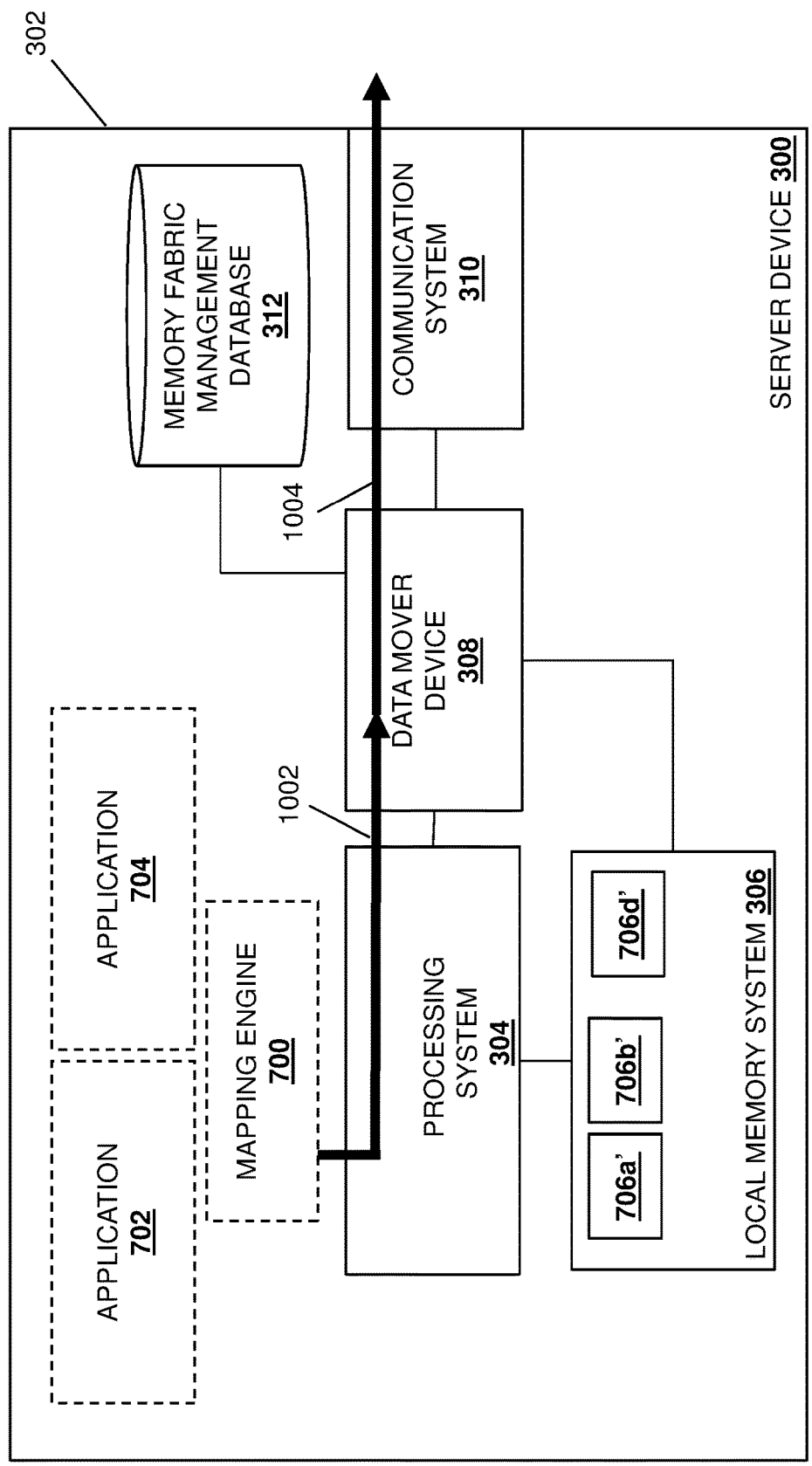
FIG. 10A is a schematic view illustrating an embodiment of the server device of FIG. 3 operating during the method of FIG. 6.
Figure 10B:
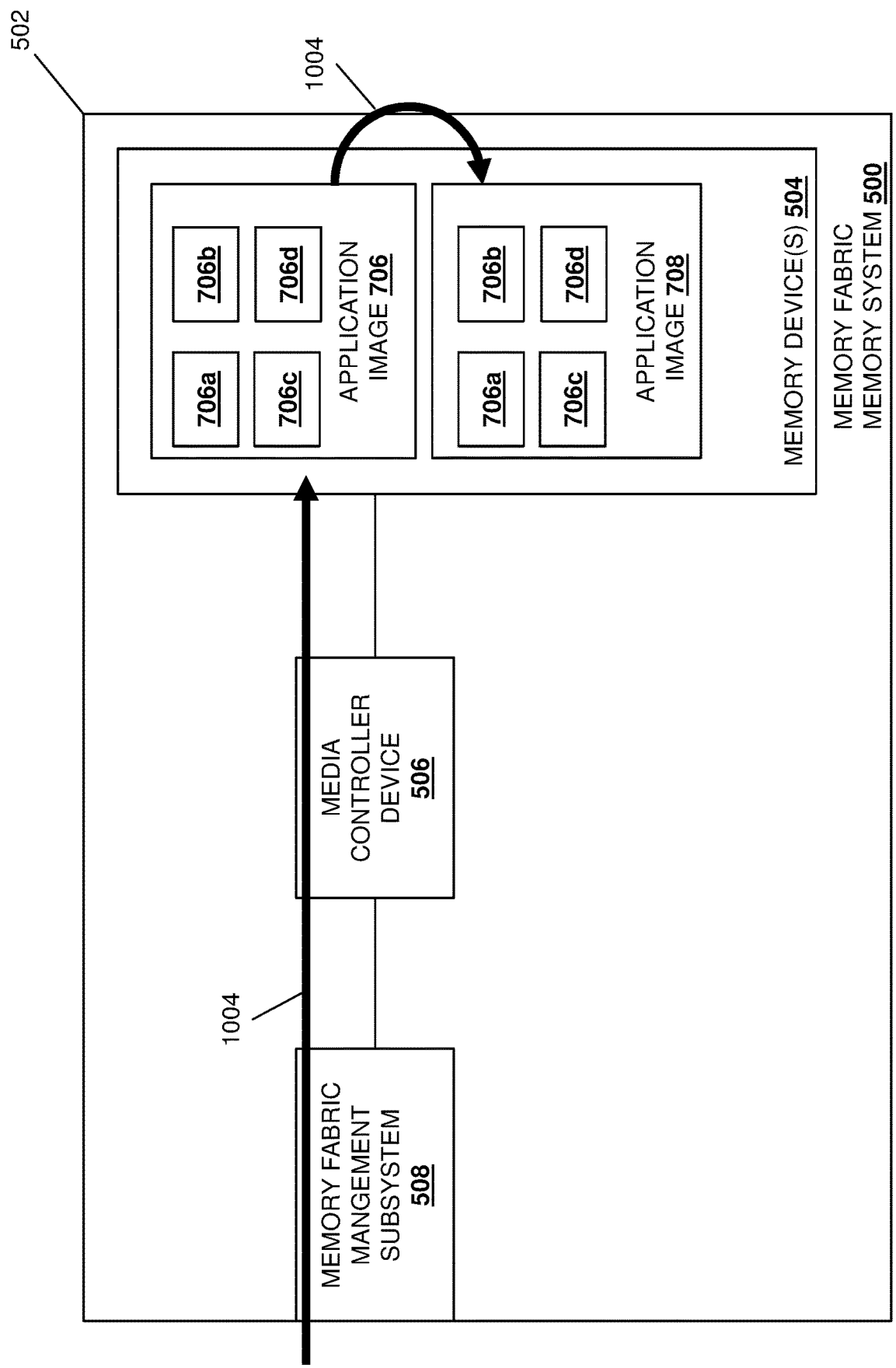
FIG. 10B is a schematic view illustrating an embodiment of the memory system of FIG. 5 operating during the method of FIG. 6.

If, at decision block 614, it is determined that the cloned application image is needed, then the method 600 proceeds to block 618 where a clone instruction is provided to the data mover device. As illustrated in FIGS. 10A, 10B, and 100, in an embodiment of block 618, the mapping engine 700 may provide a clone instruction 1002 to the data mover device 308 following a determination that the modified memory page that is stored in the local memory location in the local memory system 306 should be stored in the memory fabric memory system 500. For example, the clone instruction 1002 may include instructions to clone the application image 706, as well as move one or more modified memory pages that are stored in their respective local memory locations included in the local memory system 306 to the cloned version of the application image (or to the application image 706 itself.) For example, the mapping engine 700 may determine that the modified memory pages 706a' and 706b' that are associated with the application 702 should be moved from their respective local memory locations included in the local memory system 306 to memory fabric memory locations in the memory fabric memory system 210, which provides for a (partial) copy of the application image 706 that includes the memory pages 706c and 706d, along with the modified memory pages 706a' and 706b', and that is available in the memory fabric memory system 210 for utilization with the application 702.

The method 600 then proceeds to block 620 where the application image is cloned to provide a cloned application image. As illustrated in FIGS. 10A, 10B, and 100, in an embodiment of block 620, the data mover device 308 may perform clone operations 1004 that operate to clone the application image 706 and generate an application image 708 (illustrated in FIG. 10B) and/or an application image 710 (illustrated in FIG. 100). In various embodiments and as illustrated in FIG. 10B, the application image 708 may be a "full clone" of the application image 706 and, as such, may include a copy of each of the memory page 706a, 706b, 706c, and 706d that are each stored in respective memory fabric memory locations in the memory fabric memory system 500 that are different than the memory fabric memory locations that store the memory pages 706a, 706b, 706c, and 706d included in the application image 706. In other embodiments, the application image 708 may be "linked clone" or "partial clone" of the application image 706 and, as such, may include only the memory pages that are going to be modified. For example, as illustrated in FIG. 100, an application image 710 may include the memory page 706a and 706b, as the memory pages 706c and 706d will not be modified when the modified memory page 706a' and the modified memory page 706b' are moved into the memory fabric memory system 500, discussed in further detail below. As such, the application image 710 includes a copy of the memory page 706a and 706b that are each stored in respective memory fabric memory locations in the memory fabric memory system 500 that are different than the memory fabric memory locations that store the memory pages 706a and 706b that are included in the application image 706.

Figure 10C:
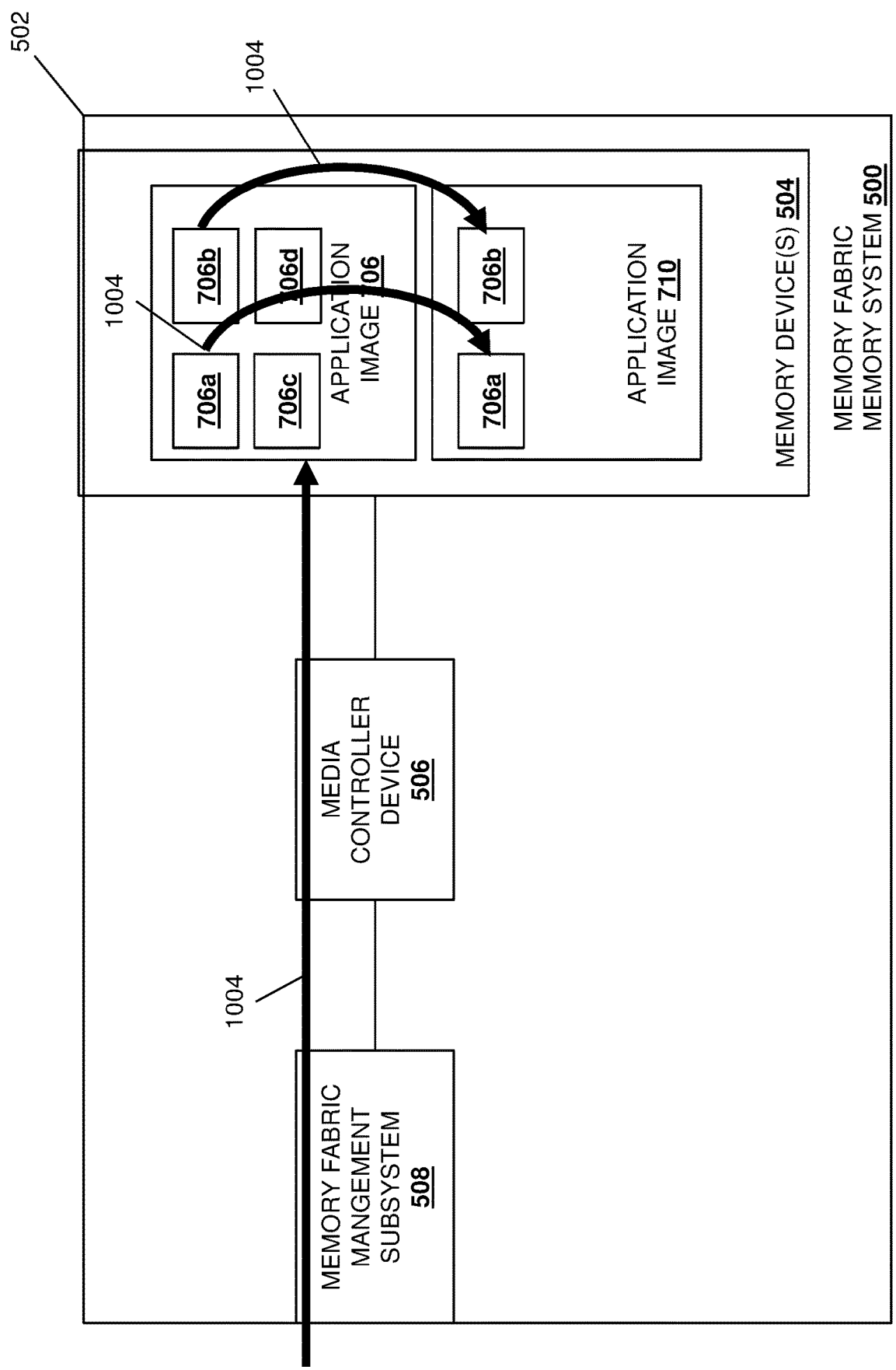
FIG. 10C is a schematic view illustrating an embodiment of the memory system of FIG. 5 operating during the method of FIG. 6.

The method 600 may then proceed to block 622 where each memory fabric memory location that stores the cloned versions of the plurality of memory pages is identified to the mapping engine to allow for the updating of the mappings for the plurality of applications. In an embodiment, at block 622, the data mover device 308 may identify the memory fabric memory locations in which the cloned versions of the plurality of memory pages are stored to the mapping engine 700. With reference to FIGS. 10A-10C, the mapping engine 700 may modify notational reference information in the memory fabric management database 312 in order to disassociate the application 704 from each of the memory fabric memory locations that store the plurality of memory pages 706a, 706b, 706c, and 706d, and may associate the application 704 with the memory fabric locations that store the cloned versions of the plurality of memory pages 706a, 706b, 706c, and 706d included in the application image 708. However, in embodiments such as the illustrated example in which the application 704 is associated with the modified memory page 706d' stored in a local memory location in the local memory system 306, the mapping engine 700 may not modify the notational reference information for that memory page 706d'. Furthermore, the mapping engine 700 may maintain the mapping of the application 702 with each of the memory fabric memory locations that store the memory pages 706c and 706d utilized with the application image 706.

Referring to the example in FIG. 10O, the mapping engine 700 may modify notational reference information in the memory fabric management database 312 in order to disassociate the application 704 from each of the memory fabric memory locations that store the plurality of memory pages 706a and 706b in the application image 706, and may associate the application 704 with the memory fabric locations that store the cloned versions of the plurality of memory pages 706a and 706b included in the application image 710. Furthermore, the mapping engine 700 may maintain the mapping of the application 702 with each of the memory fabric memory locations that store the memory pages 706c and 706d that are utilized with the application image 706. However, while the above example discusses disassociating the application 704 from memory pages included in the application image 706 (or a portion of the application image 706) and associating the application 704 with cloned versions of the memory pages included in the application image 710, one of skill in the art will recognize that the application 702 may be disassociated from memory pages included in the application image 706 (or a portion of the application image 706) and associated with the cloned versions of the memory pages included in the application image 710 (or any cloned application image) while remaining within the scope of the present disclosure as well.

Figure 11A:
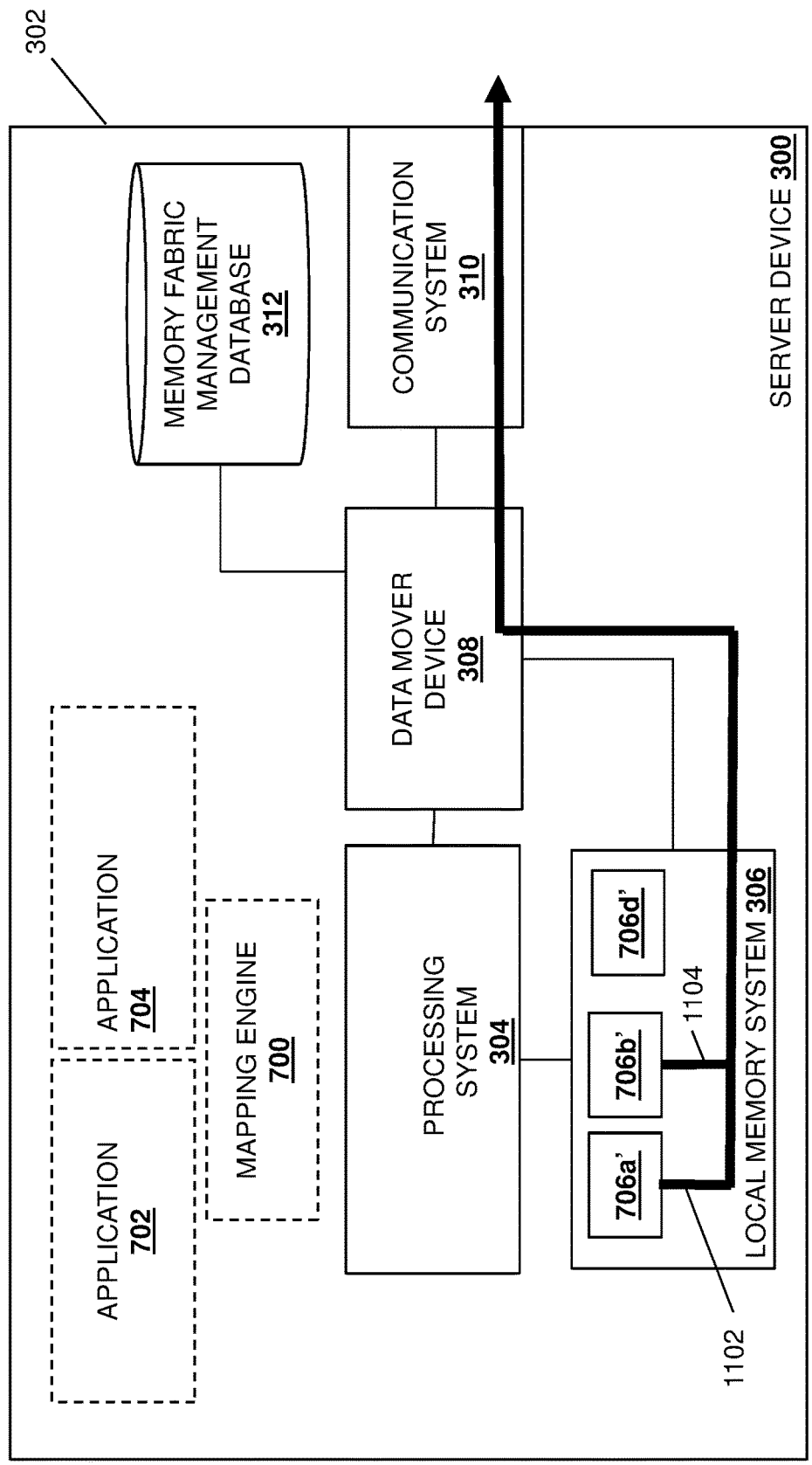
FIG. 11A is a schematic view illustrating an embodiment of the server device of FIG. 3 operating during the method of FIG. 6.
Figure 11B:
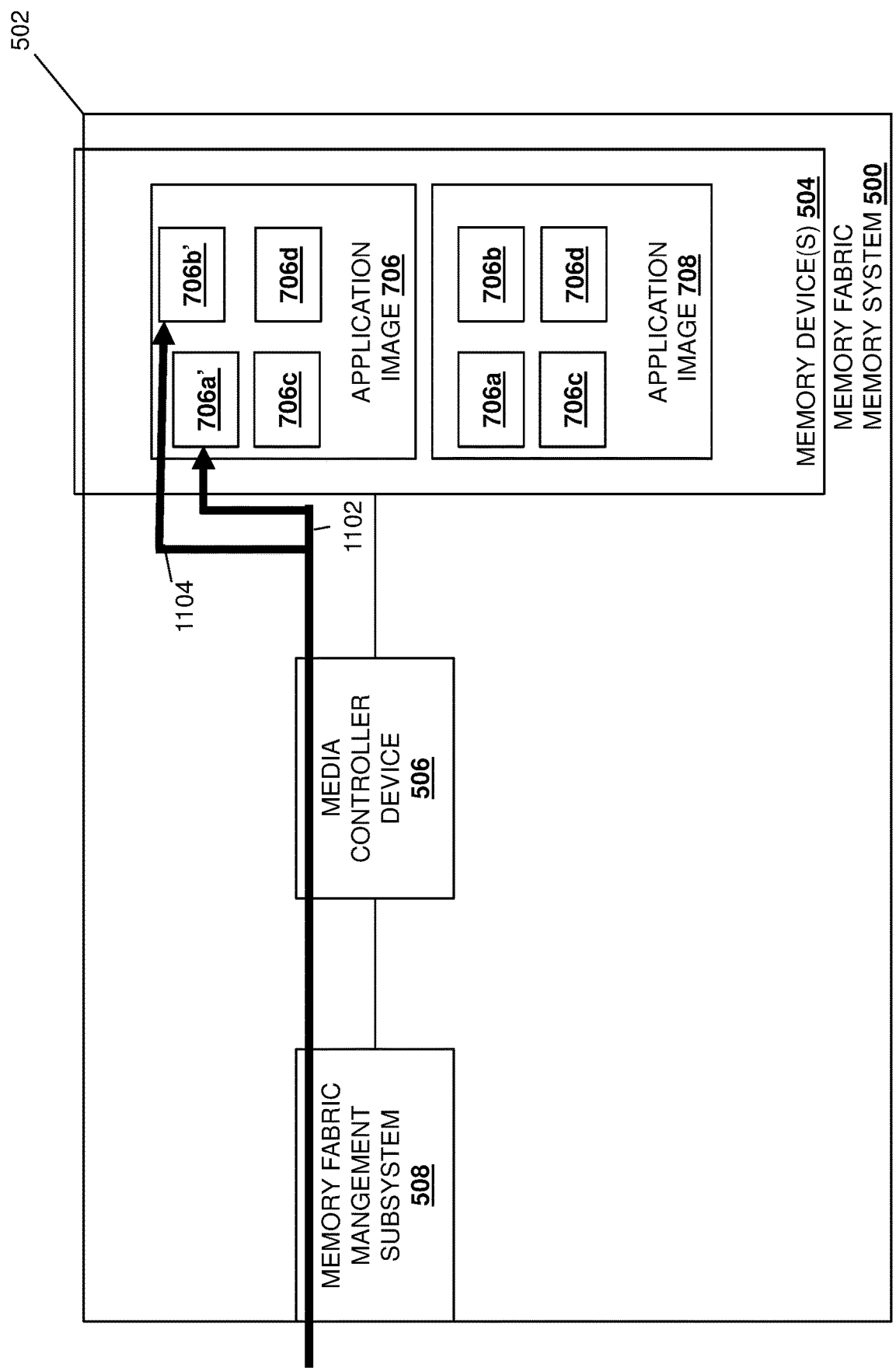
FIG. 11B is a schematic view illustrating an embodiment of the memory system of FIG. 5 operating during the method of FIG. 6.
Figure 11C:
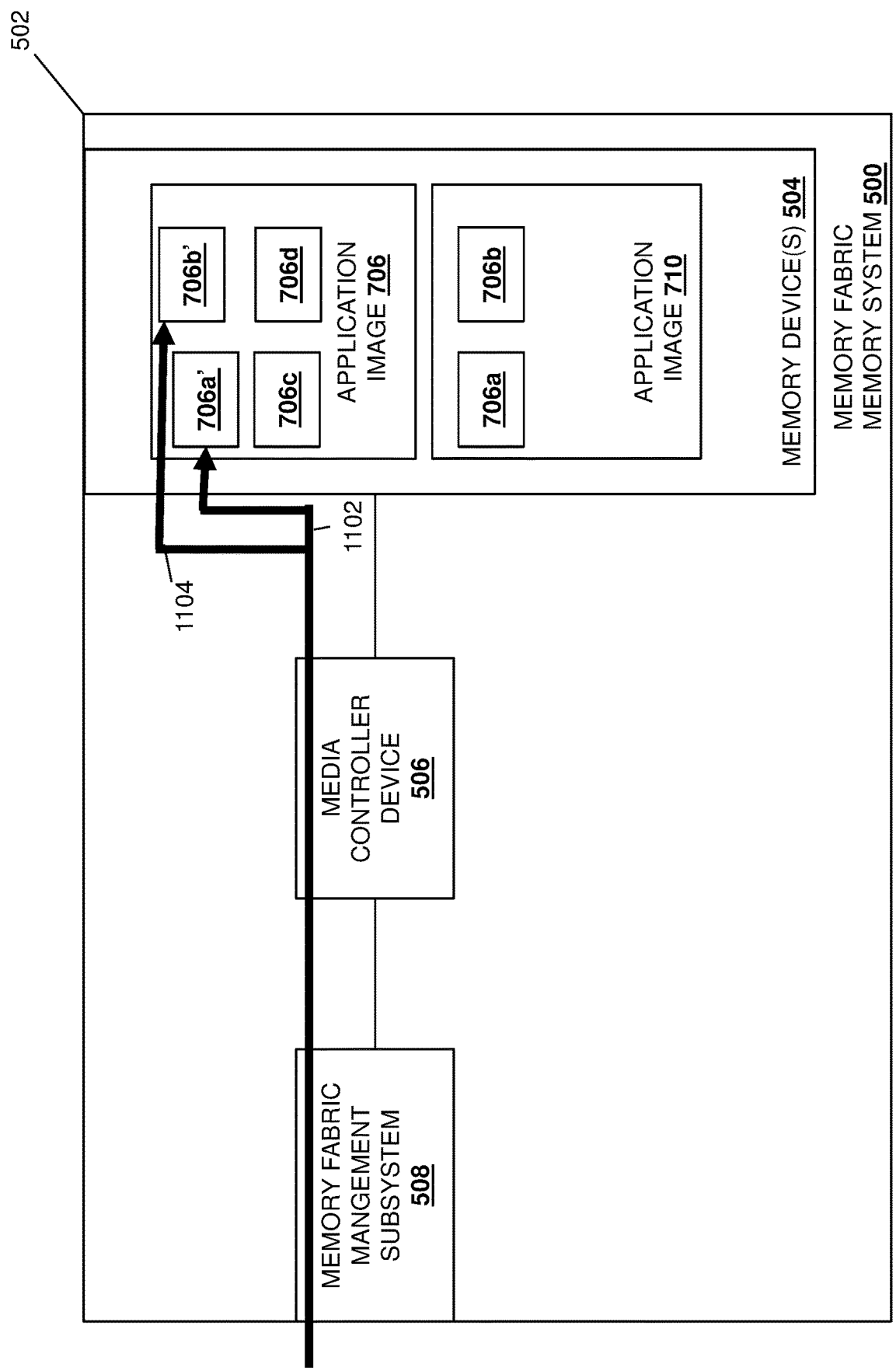
FIG. 11C is a schematic view illustrating an embodiment of the memory system of FIG. 5 operating during the method of FIG. 6.

The method 600 may then proceed to block 624 where the modified memory page is moved from the local memory location in the local memory system to memory fabric memory system in order to replace the memory page in the memory fabric memory system that corresponds with the modified memory page. As illustrated in FIGS. 11A, 11B, and 11C, in an embodiment of block 624, the data mover device 308 may perform a flush operation 1102 to move the modified memory page 706a' that is stored in the local memory system 306 to the memory fabric memory location in the memory fabric memory system 500 that stores the memory page 706a that is included in application image 706. Likewise, the data mover device 308 may perform a flush operation 1104 to move the modified memory page 706b' that is stored in the local memory system 306 to the memory fabric memory location in the memory fabric memory system 500 that stores the memory page 706b that is included in application image 706. As illustrated in FIG. 11B, the modified memory page 706a' may replace the memory page 706a that is included in the application image 706, while the application image 708 (e.g., a full cloned application image of the application image 706) maintains the memory page 706a. Similarly, the modified memory page 706b' may replace the memory page 706b that is included in the application image 706, while the application image 708 maintains the memory page 706b. As illustrated in FIG. 11C, the modified memory page 706a' may replace the memory page 706a that is included in the application image 706, while the application image 710 (e.g., a linked cloned application image of application image 706) maintains the memory page 706a. Similarly, the modified memory page 706b' may replace the memory page 706b that is included in the application image 706, while the application image 710 maintains the memory page 706b. While the modified memory pages 706a' and 706b' are discussed as replacing corresponding memory pages 706a and 706b in the application image 706, one of skill in the art in possession of the present disclosure will recognize that the modified memory pages 706a' and 706b' may replace corresponding memory pages 706a and 706b in the application images 708 or 710 (while the memory pages 706a and 706b in the application image 706 are maintained) while remaining within the scope of the present disclosure as well.

The method 600 may then proceed to block 626 where each memory fabric memory location that stores the modified memory pages are identified to the mapping engine to allow for the updating of the mappings for the plurality of applications. In an embodiment, at block 626, the data mover device 308 may identify the memory fabric memory locations that store the modified memory pages 706a' and 706b' to the mapping engine 700. With reference to FIGS. 11A-11C, the mapping engine 700 may modify notational reference information in the memory fabric management database 312 in order to disassociate the application 702 from each of the local memory locations that stored the modified memory pages 706a' and 706b', as well as associate the application 702 with the memory fabric memory locations that store the modified memory pages 706a' and 706b' that are included in the application image 706 in the memory fabric memory system 500. As a result, the mapping engine 700 may maintain a mapping for the application 702 with each of the memory fabric memory locations that store the plurality of memory pages 706a', 706b', 706c, and 706d that are included in the application image 706. Furthermore, the mapping engine 700 may maintain a mapping for the application 704 with each of the memory fabric memory locations that store the plurality of memory pages 706a, 706b, 706c that are included in the application image 708, as well as with the local memory location in the local memory system that stores the memory page 706d'. Alternatively, the mapping engine 700 may maintain a mapping for the application 704 with each of the memory fabric memory locations that store the plurality of memory pages 706a and 706b that are included in the application image 710, with the memory fabric memory location that stores the memory page 706c included in the application image 706, and with the local memory location in the local memory system 306 that stores the memory page 706d'.

Figure 12A:
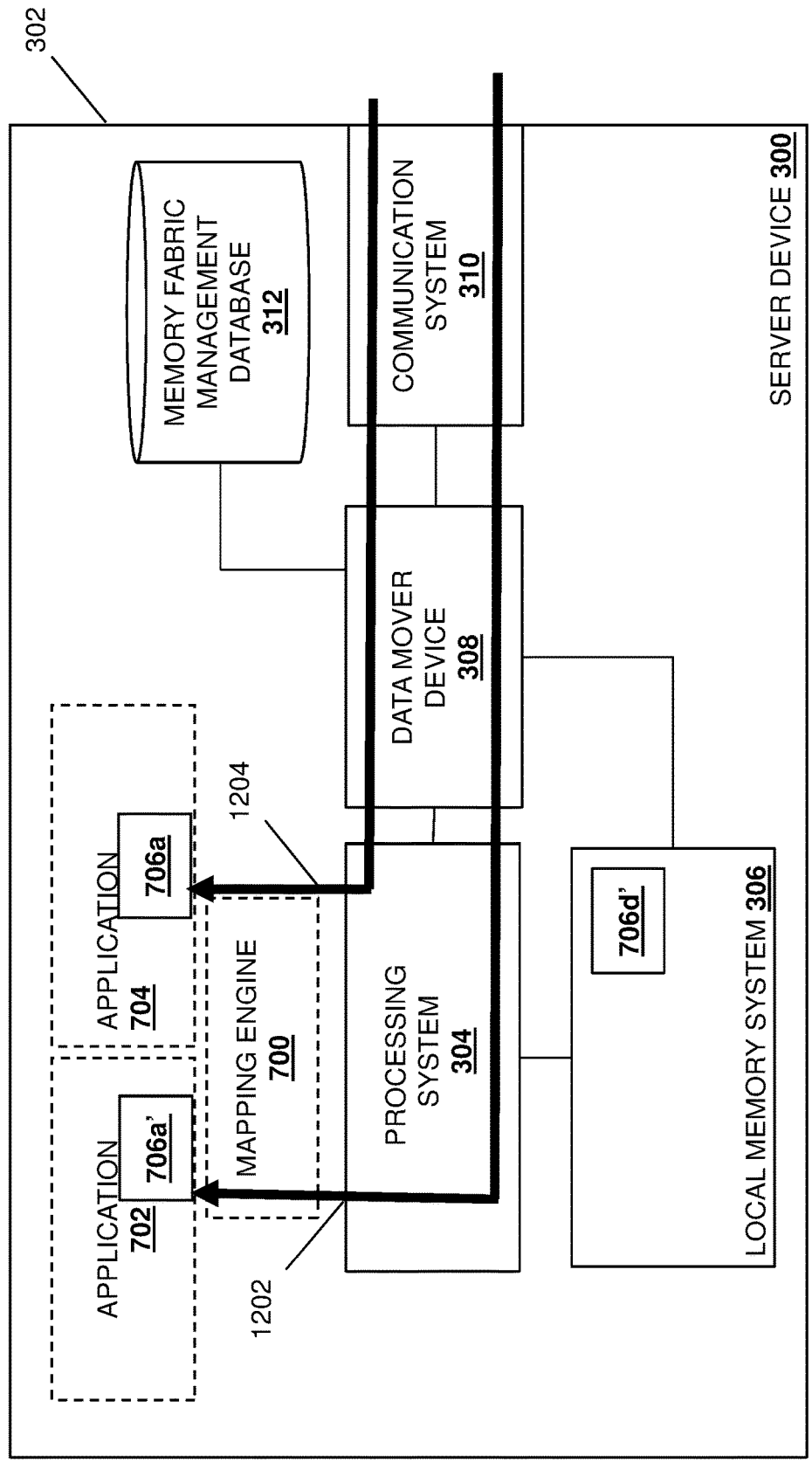
FIG. 12A is a schematic view illustrating an embodiment of the server device of FIG. 3 operating during the method of FIG. 6.
Figure 12B:
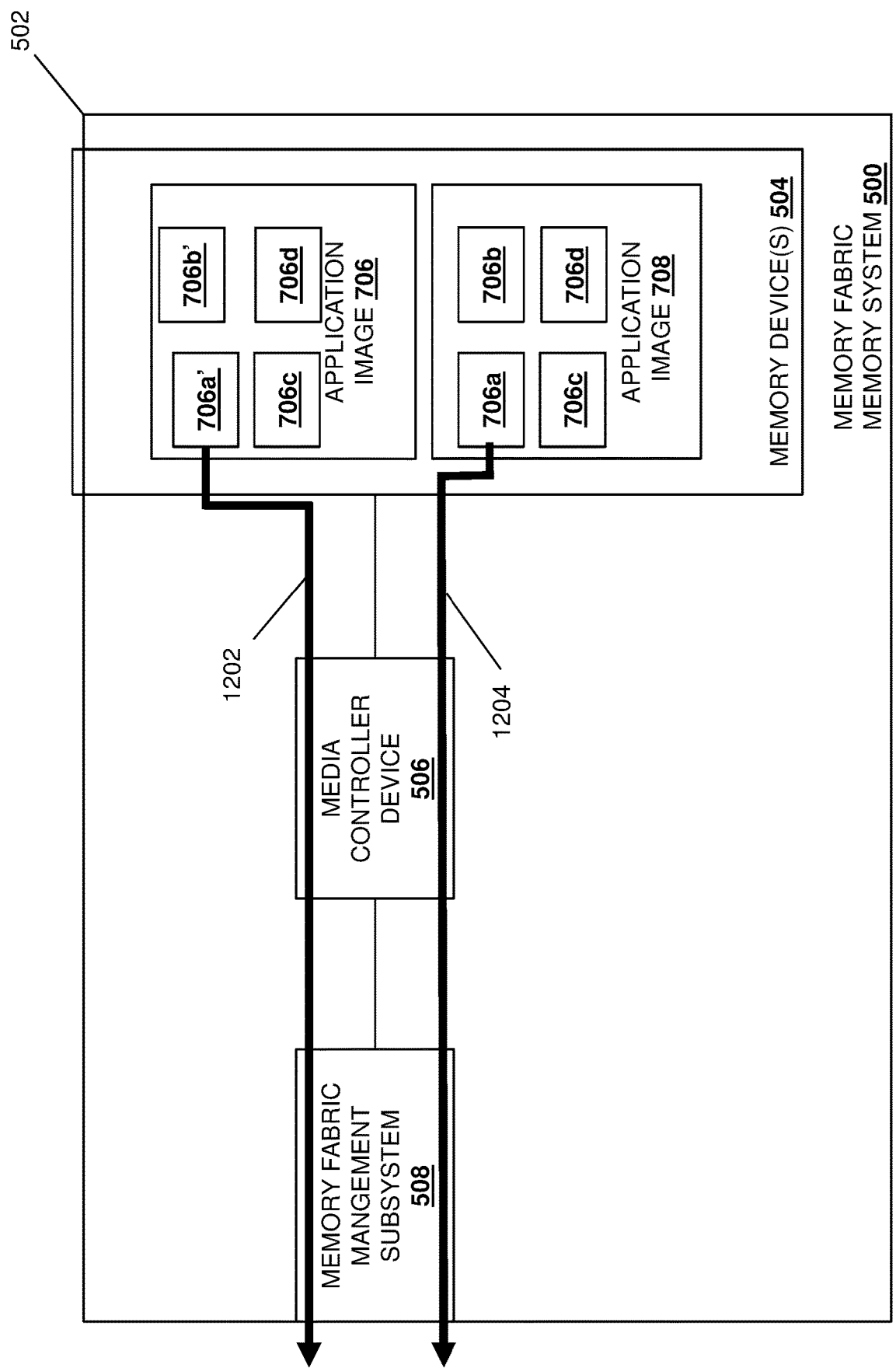
FIG. 12B is a schematic view illustrating an embodiment of the memory system of FIG. 5 operating during the method of FIG. 6.
Figure 12C:
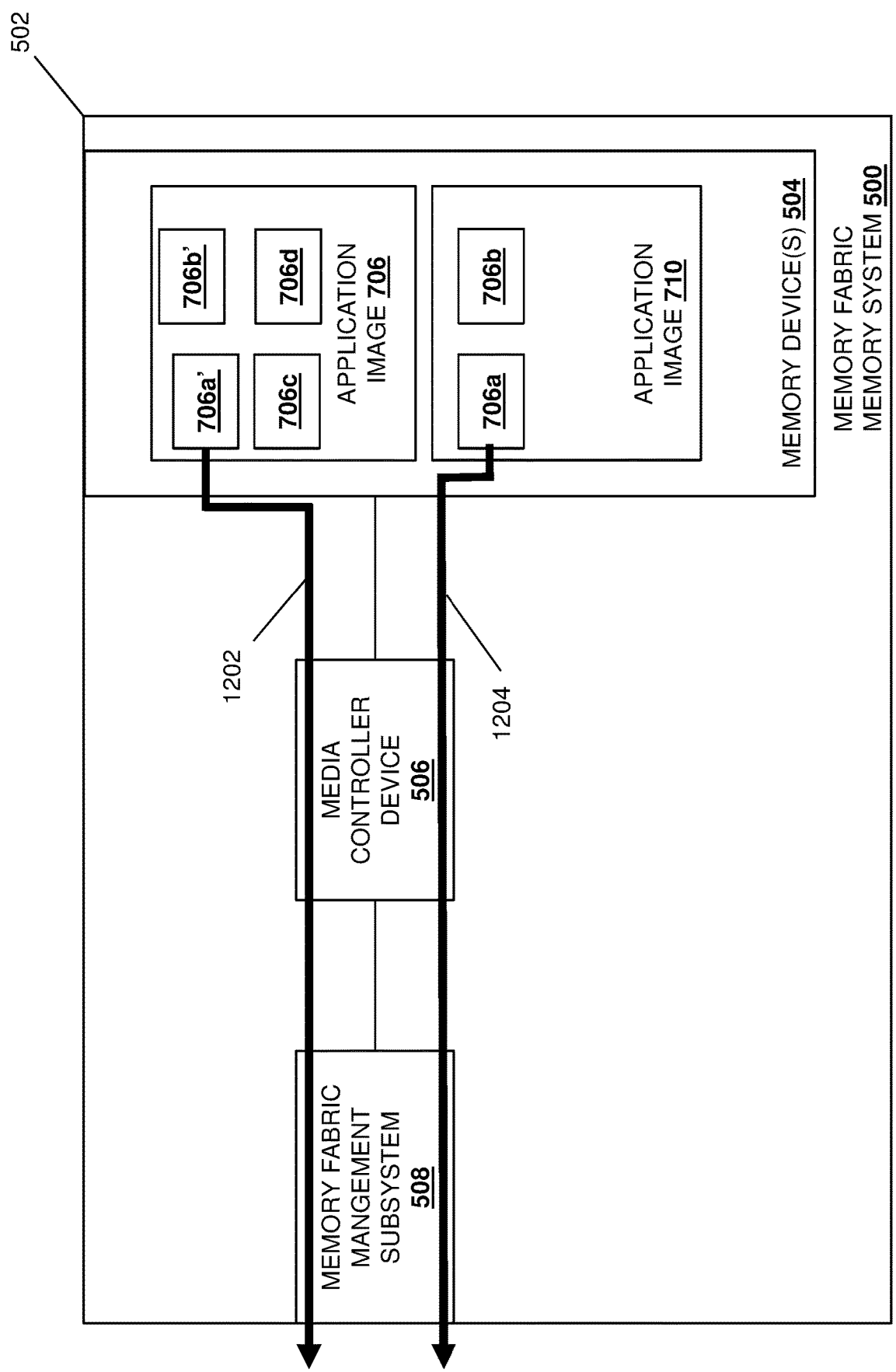
FIG. 12C is a schematic view illustrating an embodiment of the memory system of FIG. 5 operating during the method of FIG. 6.

The method 600 may then proceed to block 628 where the plurality of applications operate using the application images stored in the memory fabric memory system. As illustrated in FIGS. 12A, 12B, and 12C, in an embodiment of block 628, the application 702 may operate to perform application operations that generate application memory fabric communications 1202. For example, the application 702 may generate and transmit application memory fabric communications 1202 via the mapping engine 700 and the communication system 310 in the server device 202/300, through the switch device 208, and to the memory fabric memory system 500 to load the memory page 706a' that is included in the application image 706 and that is stored in a memory fabric memory location in the memory fabric memory system 500. For example, the mapping engine 700 may receive a load request from the application 702 to load the application information provided by the memory page 706a', and may determine, based on notational reference information included in the memory fabric management database 312, that a memory fabric memory location that stores the memory page 706a' is associated with the application 702. In a specific example, the mapping engine 700 may reference the mappings in the memory fabric management database 312 that may include reference pointers to the memory fabric memory location in which the memory page 706a' is stored, and thus the application memory fabric communications 1202 generated by the application operations may cause the memory page 706a' to be provided for use with the application 702.

Similarly, the application 704 may operate to perform application operations that generate application memory fabric communications 1204. In an embodiment, the application 704 may generate and transmit load requests via the mapping engine 700 and the communication system 310 in the server device 202/300, through the switch device 208, and to the memory fabric memory system 500 to provide for the loading of the memory page 706a that is stored in a memory fabric memory location that is included in the memory fabric memory system 500. For example, the mapping engine 700 may receive a load request from the application 704 to load the application information provided by the memory page 706a, and may determine, based on notational reference information included in the memory fabric management database 312, that a memory fabric memory location that stores the memory page 706a is associated with the application 704. In a specific example, the mapping engine 700 may include mappings in the memory fabric management database 312 that may include reference pointers to the memory fabric memory location in which the memory page 706a is stored, and thus the application memory fabric communications 1204 generated by the application operations may cause the memory page 706a to be provided for use with the application 704.

Thus, systems and method have been described that provide a mapping engine that is configured to store memory pages, which are modified from those included in an application image stored in a memory fabric memory system, in a local memory system that is provided for applications that utilize those memory pages. The mapping engine may maintain a mapping of the application that modified the memory page by disassociating the application from the memory fabric memory location that stores memory page included in the application image stored in the memory fabric memory system, and associating the application with a local memory location that is included in the local memory system that stores the modified memory page. As such, by maintaining a local memory system with modified memory pages, and mapping applications that provided the modified memory pages, costly processing-system-cycle cloning operations performed by the processing system on the application image are minimized. However, in instances in which a cloned application image is required, the mapping engine may provide a clone instruction to a data mover device, and the data mover device may clone the application image stored in the memory fabric memory system, map application(s) to that cloned application image, and move the modified memory pages from the local memory system and into a memory fabric memory location that stores the corresponding non-modified memory page included in one of the application images. As such, an application image cloning system is provided that optimizes application image cloning by only providing a cloned application image when it is more efficient to do so, while providing a mechanism to provide modified memory pages from pages included in the application image without the need to generate the cloned application image when doing so is not required.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An application image cloning system, comprising:
a memory fabric memory system that stores a first application image that includes a plurality of memory pages; and
a processing system that is coupled to the memory fabric memory system and a local memory system and that is configured to:
provide, at least in part using the first application image, a first application;
provide, at least in part using the first application image, a second application; and
provide a mapping engine that is configured to:
receive, from the first application, a first store request to store a modified first memory page that is a modified version of a first memory page included in the plurality of memory pages, wherein the first memory page is stored in a first memory fabric memory location that is included in the memory fabric memory system and that is associated with the first application and the second application in a memory fabric management database;
store the modified first memory page in a first local memory location in the local memory system;
modify, in the memory fabric management database, notational reference information in order to disassociate the first application from the first memory fabric memory location that stores the first memory page; and
associate the first application with the first local memory location that stores the modified first memory page, wherein the second application remains associated with the first memory fabric memory location that stores the first memory page.

2. The system of claim 1, wherein the mapping engine is configured to:
receive, from the first application, a first load request to load a second memory page included in the plurality of memory pages;
determine, based on the notational reference information, that a second memory fabric memory location that stores the second memory page is associated with the first application; and load, from the second memory fabric memory location, the second memory page in the first application.

3. The system of claim 1, wherein the mapping engine is configured to:
receive, from the second application, a first load request to load the first memory page;
determine, based on the notational reference information, that the first memory fabric memory location that stores the first memory page is associated with the second application; and
load, from the first memory fabric memory location, the first memory page in the second application.

4. The system of claim 1, wherein the mapping engine is configured to:
receive, from the second application, a second store request to store a modified second memory page that is a modified version of a second memory page included in the plurality of memory pages, wherein the second memory page is stored in a second memory fabric memory location that is included in the memory fabric memory system and that is associated with the first application and the second application in the memory fabric management database;
store the modified second memory page in a second local memory location in the local memory system; and
modify, in the memory fabric management database, notational reference information in order to disassociate the second application and the second memory fabric memory location that stores the second memory page; and
associate the second application with the second local memory location that stores the modified second memory page, wherein the first application remains associated with the second memory fabric memory location that stores the second memory page.

5. The system of claim 1, further comprising:
a data mover subsystem that is coupled to the processing system and the memory fabric memory system, wherein the mapping engine is configured to:
determine that the modified first memory page that is stored in the first local memory location in the local memory system should be stored in the memory fabric memory system; and
provide a clone instruction to the data mover subsystem, wherein the data mover subsystem is configured to:
clone the first application image to provide a second application image that is stored in the memory fabric memory system and that includes cloned versions of the plurality of memory pages; and
provide each memory fabric memory location that stores the cloned versions of the plurality of memory pages to the mapping engine, wherein the mapping engine is configured to:
modify, in the memory fabric management database, notational reference information in order to disassociate each of the memory fabric memory locations that store the plurality of memory pages from the second application; and
associate the second application with the memory fabric memory locations that store the cloned versions of the plurality of memory pages included in the second application image, wherein the first application remains associated with each of the memory fabric memory locations that store the plurality of memory pages included in the first application image.

6. The system of claim 5, wherein the data mover subsystem is configured to:
move, subsequent to the cloning of the first application image, the modified first memory page from the first local memory location to the first memory fabric memory location in order to replace the first memory page, wherein the mapping engine is configured to:
modify, in the memory fabric management database, notational reference information in order to disassociate the first local memory location that stores the modified first memory page from the first application; and
associate the first application with the first memory fabric memory location that stores the modified first memory page.

7. The system of claim 1, further comprising:
a data mover subsystem that is coupled to the processing system and the memory fabric memory system, wherein the mapping engine is configured to:
determine that the modified first memory page that is stored in the first local memory location in the local memory system should be stored in the memory fabric memory system; and
provide a clone instruction to the data mover subsystem, wherein the data mover subsystem is configured to:
clone the first application image to provide a second application image that is stored in the memory fabric memory system and that includes a cloned version of the first memory page; and
provide a second memory fabric memory location for the cloned version of the first memory page to the mapping engine, wherein the mapping engine is configured to:
modify, in the memory fabric management database, notational reference information in order to disassociate the first memory fabric memory location that stores the first memory page included in the first application image from the second application; and
associate the second application with the second memory fabric memory location that stores the cloned version of the first memory page included in the second application image, wherein the first application remains associated with each memory fabric memory location that stores the plurality of memory pages included in the first application image and the second application remains associated with each memory fabric memory location that stores the plurality of memory pages included in the first application image except for the first memory fabric memory location that stores the first memory page.

8. The system of claim 7, wherein the data mover subsystem is configured to:
move, subsequent to the cloning of the first application image, the modified first memory page from the first local memory location to the first memory fabric memory location to replace the first memory page, wherein the mapping engine is configured to:
modify, in the memory fabric management database, notational reference information in order to disassociate the first local memory location that stores the modified first memory page from the first application; and associate the first application with the first memory fabric memory location that stores the modified first memory page.

9. An Information Handling System (IHS), comprising:
a processing system; and
a local memory system that is coupled to the processing system and that includes instructions that, when executed by the processing system, cause the processing system to provide a mapping engine that is configured to:
  receive, from a first application, a first store request to store a modified first memory page that is a modified version of a first memory page included in a plurality of memory pages included in a first application image stored in a memory fabric memory system, wherein the first memory page is stored in a first memory fabric memory location that is included in the memory fabric memory system and that is associated with the first application and a second application in a memory fabric management database;
  store the modified first memory page in a first local memory location in the local memory system;
  modify, in the memory fabric management database, notational reference information in order to disassociate the first application from the first memory fabric memory location that stores the first memory page; and
  associate the first application with the first local memory location that stores the modified first memory page, wherein the second application remains associated with the first memory fabric memory location that stores the first memory page.

10. The IHS of claim 9, wherein the mapping engine is configured to:
  receive, from the first application, a first load request to load a second memory page included in the plurality of memory pages;
  determine, based on the notational reference information, that a second memory fabric memory location that stores the second memory page is associated with the first application; and
  load, from the second memory fabric memory location, the second memory page in the first application.

11. The IHS of claim 9, wherein the mapping engine is configured to:
  receive, from the second application, a first load request to load the first memory page;
  determine, based on the notational reference information, that the first memory fabric memory location that stores the first memory page is associated with the second application; and
  load, from the first memory fabric memory location, the first memory page in the second application.

12. The IHS of claim 9, wherein the mapping engine is configured to:
  receive, from the second application, a second store request to store a modified second memory page that is a modified version of a second memory page included in the plurality of memory pages, wherein the second memory page is stored in a second memory fabric memory location that is included in the memory fabric memory system and that is associated with the first application and the second application in the memory fabric management database;
  store the modified second memory page in a second local memory location in the local memory system; and
  modify, in the memory fabric management database, notational reference information in order to disassociate the second application and the second memory fabric memory location that stores the second memory page; and
  associate the second application with the second local memory location that stores the modified second memory page, wherein the first application remains associated with the second memory fabric memory location that stores the second memory page.

13. The IHS of claim 9, further comprising:
a data mover processing system; and
a data mover memory system that is coupled to the data mover processing system and that includes instructions that, when executed by the data mover processing system, cause the data mover processing system to provide a data mover engine, wherein the data mover engine is configured to:
  receive a clone instruction;
  clone the first application image to provide a second application image that is stored in the memory fabric memory system and that includes cloned versions of the plurality of memory pages; and
  provide each memory fabric memory location that stores the cloned versions of the plurality of memory pages to the mapping engine.

14. The IHS of claim 13, wherein the mapping engine is configured to:
  modify, in the memory fabric management database, notational reference information in order to disassociate each of the memory fabric memory locations that store the plurality of memory pages from the second application; and
  associate the second application with the memory fabric memory locations that store the cloned versions of the plurality of memory pages included in the second application image, wherein the first application remains associated with each of the memory fabric memory locations that store the plurality of memory pages included in the first application image.

15. The IHS of claim 13, wherein the data mover engine is configured to:
  move, subsequent to the cloning of the first application image, the modified first memory page from the first local memory location to the first memory fabric memory location in order to replace the first memory page, wherein the mapping engine is configured to:
  modify, in the memory fabric management database, notational reference information in order to disassociate the first local memory location that stores the modified first memory page from the first application; and
  associate the first application with the first memory fabric memory location that stores the modified first memory page.

16. A method of cloning application images, comprising:
receiving, by a mapping engine from a first application, a first store request to store a modified first memory page that is a modified version of a first memory page included in a plurality of memory pages included in an first application image stored in a memory fabric memory system, wherein the first memory page is stored in a first memory fabric memory location that is included in the memory fabric memory system and that is associated with the first application and a second application in a memory fabric management database;

storing, by the mapping engine, the modified first memory page in a first local memory location in a local memory system;

modifying, by the mapping engine in the memory fabric management database, notational reference information in order to disassociate the first application from the first memory fabric memory location that stores the first memory page; and associating, by the mapping engine, the first application with the first local memory location that stores the modified first memory page, wherein the second application remains associated with the first memory fabric memory location that stores the first memory page.

17. The method of claim 16, further comprising:

receiving, by the mapping engine from the first application, a first load request to load a second memory page included in the plurality of memory pages;

determining, by the mapping engine based on the notational reference information, that a second memory fabric memory location that stores the second memory page is associated with the first application; and loading, by the mapping engine from the second memory fabric memory location, the second memory page in the first application.

18. The method of claim 16, further comprising:

receiving, by the mapping engine from the second application, a first load request to load the first memory page;

determining, by the mapping engine based on the notational reference information, that the first memory fabric memory location that stores the first memory page is associated with the second application; and loading, by the mapping engine from the first memory fabric memory location, the first memory page in the second application.

19. The method of claim 16, further comprising:

receiving, by the mapping engine from the second application, a second store request to store a modified second memory page that is a modified version of a second memory page included in the plurality of memory pages, wherein the second memory page is stored in a second memory fabric memory location that is included in the memory fabric memory system and that is associated with the first application and the second application in the memory fabric management database;

storing, by the mapping engine the modified second memory page in a second local memory location in the local memory system; and modifying, by the mapping engine in the memory fabric management database, notational reference information in order to disassociate the second application and the second memory fabric memory location that stores the second memory page; and associating, by the mapping engine the second application with the second local memory location that stores the modified second memory page, wherein the first application remains associated with the second memory fabric memory location that stores the second memory page.

20. The method of claim 16, further comprising:

receiving, by a data mover device, a clone instruction;

cloning, by the data mover device, the first application image to provide a second application image that is stored in the memory fabric memory system and that includes cloned versions of the plurality of memory pages;

providing, by the data mover device, each memory fabric location that stores the cloned versions of the plurality of memory pages to the mapping engine; and moving, by the data mover device and subsequent to the cloning of the first application image, the modified first memory page from the first local memory location to the first memory fabric memory location in order to replace the first memory page, wherein the mapping engine is configured to:

modify, in the memory fabric management database, notational reference information in order to disassociate the first local memory location that stores the modified first memory page from the first application; and associate the first application with the first memory fabric memory location that stores the modified first memory page.

* * * * *